United States Patent
Horita et al.

(10) Patent No.: US 8,189,232 B2
(45) Date of Patent: May 29, 2012

(54) DENSITY CALCULATING APPARATUS, DENSITY SETTING APPARATUS, DENSITY CALCULATING PROGRAM STORAGE MEDIUM, AND DENSITY SETTING PROGRAM STORAGE MEDIUM

(75) Inventors: Shuhei Horita, Ashigarakami-gun (JP); Takahiro Mishima, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 866 days.

(21) Appl. No.: 12/255,893

(22) Filed: Oct. 22, 2008

(65) Prior Publication Data

US 2009/0103121 A1   Apr. 23, 2009

(30) Foreign Application Priority Data

Oct. 23, 2007   (JP) ................................. 2007-275592
Sep. 30, 2008   (JP) ................................. 2008-254407

(51) Int. Cl.
  *G06F 15/00*    (2006.01)
  *G06K 15/00*    (2006.01)
  *G06K 9/00*     (2006.01)

(52) U.S. Cl. ........................... 358/1.9; 358/2.1; 382/167

(58) Field of Classification Search ........................ None
See application file for complete search history.

(56) References Cited

U.S. PATENT DOCUMENTS

| | | | | |
|---|---|---|---|---|
| 5,809,366 A | * | 9/1998 | Yamakawa et al. | 399/39 |
| 6,205,246 B1 | * | 3/2001 | Usami | 382/167 |
| 7,706,034 B2 | * | 4/2010 | Monga et al. | 358/520 |
| 7,869,089 B2 | * | 1/2011 | Horita | 358/1.9 |
| 2003/0053085 A1 | * | 3/2003 | Takemoto | 358/1.9 |
| 2007/0013964 A1 | * | 1/2007 | Ono | 358/406 |
| 2007/0139678 A1 | * | 6/2007 | Horita | 358/1.9 |
| 2008/0062193 A1 | * | 3/2008 | Olson | 345/591 |
| 2009/0116048 A1 | * | 5/2009 | Usami | 358/1.9 |

FOREIGN PATENT DOCUMENTS

| | | |
|---|---|---|
| JP | 2001-347645 A | 12/2001 |
| JP | 2004-106523 A | 4/2004 |

\* cited by examiner

*Primary Examiner* — Twyler Haskins
*Assistant Examiner* — Barbara Reinier
(74) *Attorney, Agent, or Firm* — Sughrue Mion, PLLC

(57) ABSTRACT

A density calculating apparatus includes: an image data acquisition section that acquires print image data representing a print image; a place designating section that designates a place on the print image; and a target color acquisition section that acquires a target color of a color of the place. The apparatus further includes: a color guess section that guesses a print color of the place to be printed by a printing system, by using a patch image produced based on a predetermined criterion; and a density calculation section that calculates the print densities of the ink materials having the plurality of colors by using the color guess section so that the target color is achieved at the place by the printing system based on the print image data.

18 Claims, 16 Drawing Sheets

○ TABLE MAKING POINT

DENSITY CALCULATING APPARATUS, DENSITY SETTING APPARATUS, DENSITY CALCULATING PROGRAM STORAGE MEDIUM, AND DENSITY SETTING PROGRAM STORAGE MEDIUM

BACKGROUND OF THE INVENTION

1. Field of the Invention

The present invention relates to a density calculating apparatus that calculates the print density of a color material when an image is printed in a printing system, a density calculating program storage medium, a density setting apparatus that sets the print density of a color material, and a density setting program storage medium.

2. Description of the Related Art

Conventionally, in a printing field, a print image has been formed by a series of processing where an image is edited by a personal computer and the like, a film original plate is made on the basis of the edited image, a plate is made on the basis of the film original plate, the plate is mounted on a printing machine and ink materials are applied thereto, and the applied ink materials are transferred onto a paper sheet. Further, in recent years, a CTP (Computer To Plate), which directly forms an image on a plate, is provided in a printing machine, and an automated digital printing machine, which can perform a plate making process and the like for acquiring a skilled technique, has been developed. Accordingly, the printing machine has been demanded as a printing machine for small quantity batch production that makes small quantity and various kinds of printed matters.

Meanwhile, a series of operations for performing printing on a paper sheet are massive operations of which a printing unit corresponds to several hundred copies, and large processing time or cost are required. Accordingly, before the actual printing operation, a proof image where a print image is reproduced is formed by a printer or the like more convenient than the printing machine, and the finishing of the print image is previously conformed by using the proof image. In addition, in the recent years, a proof image has been displayed on a calibrated monitor. Accordingly, it is possible to efficiently reduce the waste of a paper sheet, and to simply confirm an image of a print image in printing processes.

However, in the prior confirmation using the proof image, it is possible to confirm the design or the entire image of the print image. However, the color of the print image including the thickness of an ink material or the like or the finishing of the print image is confirmed by printing an image with the printing machine. In actual fact, the preferred thickness of an ink material varies depending on the print media, such as a newspaper, an advertising matter, a poster, and a magazine. Accordingly, when the print image is made, a user manually adjusts the print density of the ink of the printing machine until a desired color is obtained while the printing machine is driven and test printing is repeated. For this reason, there is a problem in that a large number of waste sheets are generated. Further, the number of waste sheets generated until the final print density of the ink is determined is substantially constant regardless of print copies. Accordingly, as the print copies are small, a ratio of the waste sheets is increased. Therefore, as for the digital printing machine for small quantity batch production, in order to reduce cost, it is important to shorten the time required until the print density of the ink is determined, and to suppress the generation of waste sheets.

In regard to this point, Japanese Patent Application Publication No. 2001-347645 discloses a technique where a forecast image where a print image is forecasted is formed on the basis of an opening degree value of an ink key that is used to adjust the print density of an ink material and a pixel value of image data, and a user manually adjusts the print density of an ink material while referring to the forecast image. Japanese Patent Application Publication No. 2004-106523 discloses a technique where a color coordinate value is acquired using an ICC profile on a halftone dot area ratio of a noticeable portion of a print image, the color coordinate value is set as a target density value, and the print density of an ink material is automatically adjusted so that a density value of a noticeable portion of a print image approaches the target density value. In the technique disclosed in Japanese Patent Application Publication No. 2001-347645, since the color of the print image can be broadly conformed before printing, it is possible to shorten the processing time required until the print density of the ink is determined. In the technique disclosed in Japanese Patent Application Publication No. 2004-106523, it is possible to easily adjust the print density of an ink material so that the color of a printed matter of the reference printing machine is reproduced by another printing machine.

However, in the technique disclosed in Japanese Patent Application Publication No. 2001-347645, in order to improve the forecast accuracy of a print image, the opening degree value of the ink key does need to minutely correspond to the pixel value of the image data, and the amount of data becomes huge. Further, it is possible to confirm the forecast image of the print image. However, an operation for finding out the print density of the ink required to correct the color of the forecast image into a desired color requires a skilled technique, and there is a problem in that it is difficult for an inexperienced user to adjust the print density of the ink.

Furthermore, in the technique disclosed in Japanese Patent Application Publication No. 2004-106523, until a target density value is achieved, the print density of the ink of the print image is finely adjusted while test printing is actually performed. Therefore, if an ink material of which the initial state is not optimally set, much time is required until the print density of the ink is stabilized. For this reason, there is a problem in that a large number of waste sheets are generated.

SUMMARY OF THE INVENTION

The present invention has been made in view of the above circumstances and provides a density calculating apparatus, a density setting apparatus, a density calculating program storage medium, and a density setting program storage medium that can suppress the generation of waste sheets and manually adjust the print density of a color material without requiring a skilled technique.

A density calculating apparatus according to the present invention includes:

an image data acquisition section that acquires print image data representing a print image to be printed by a printing system, the printing system setting print densities of color materials having a plurality of colors and printing an image based on the image data by using the color materials in the print densities;

a place designating section that designates a place on the print image represented by the print image data acquired by the image data acquisition section;

a target color acquisition section that acquires a target color of a color of the place;

a color guess section that guesses a print color of the place to be printed by the printing system on the basis of a corresponding relationship between print densities and colors of patches, which patches are obtained by printing the chart image in each print density by the printing system based on the chart image data representing a chart image where patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density; and a density calculation section that calculates the print densities of the color materials having the plurality of colors by using the color guess section so that the target color acquired by the target color acquisition section is achieved at the place by the printing system based on the print image data.

In this case, a "place" in the present invention may be one point, a region, or a point group including several points.

Further, the print density of the color material in the present invention indicates the density of the print image that is set by adjusting the amount of a supplied color material through the opening and closing of a color material key.

The present invention proposes a print color forecasting method where the print density of a color material is set to a standard print density of the print image where the print color of the print image becomes a predetermined standard color, and a changed print density where the print density of each of the color materials having the plurality of colors is changed from the standard print density to an optical density by ±0.1, ±0.2, . . . , when a print image is formed on the basis of print image data where each color dot percentage is 100%, and a print color is forecasted in a desired print density by using the colorimetric result of a patch on each formed chart image. According to the print color forecasting method, it is possible to accurately confirm a color of a print image before the image is actually printed.

According to the density calculating apparatus of the present invention, the print density of each of the color materials having colors is calculated by the inverse operation of the print color forecast method so that a target color is achieved at the designate place on the print image printed by the printing system. Therefore, it is possible to easily set the print density of a color material without requiring a skilled technique, to shorten time required until the print density of the color material is determined, and to suppress the generation of waste sheets.

In the density calculating apparatus according to the present invention, it is preferable that the place designating section designates a plurality of places as the place while giving different priority orders to the places, the target color acquisition section acquires target colors of the plurality of places, and the density calculation section calculates common print densities where the target colors of the plurality of places are achieved by the printing system, while emphasizing the achievement accuracy of the place, which has a relatively high priority order, of the plurality of places as compared to the achievement accuracy of the place that has a relatively low priority order.

Generally, in many cases, the printing system represents colors by the combination of print densities of four color materials of C, M, Y, and K colors. However, it is difficult to realize each target color of multiple places only with the combination of the print densities of these four color materials. According to the preferred density calculation apparatus, realization accuracy at a place having a higher priority among multiple places is calculated preferentially than a place having a relatively lower priority, so that it is possible to realize an important color, such as a company logo color with high accuracy.

In the density calculating apparatus according to the present invention, it is preferable that the place designating section displays the print image on the basis of the print image data, and designates the place according to a selection operation for selecting the place on the displayed print image.

A user can easily designate a place, which achieves the target color easily, only by selecting an important color on the displayed print image.

In the density calculating apparatus according to the present invention, it is preferable that the place designating section designates a region on the print image, and the target color acquisition section acquires a target color of an average color of the region.

Colors, such as a flesh color, a green color, a blue color, and a gray color, are important components that determine the impression of a printed matter, and are handled as important colors in a printing field. According to the density calculating apparatus of the present invention, it is possible to easily obtain a print image, which has good appearance, by broadly designating a region, which includes an important color such as a green color or a flesh color, on the print image.

In the density calculating apparatus according to the present invention, it is preferable that the place designating section designates a region on the print image, and the target color acquisition section acquires a target color of a color that most frequently appears in the region.

According to the preferred density calculating apparatus, even though important colors are dispersed on the print image, it is possible to obtain a print image where the important color is achieved by a target color, only by selecting a region including many important colors.

In the density calculating apparatus according to the present invention, it is preferable that the print image data is formed of a group of color data that represents colors of points on the print image, and the place designating section designates one or more point groups of which the number is large among point groups including points on the print image where the color data are common, as the place.

According to the preferred density calculating apparatus, it is possible to reduce user's efforts to select an important color, and to form a print image where a color corresponding to high frequency of appearance is represented by the target color.

In the density calculating apparatus according to the present invention, it is preferable that the print image data is formed of groups of the color data that represents colors of points on the print image, and the place designating section designates each point, of which the color is represented by the same color data as those representing a predetermined important color, on the print image as the place.

It is possible to easily obtain a print image where the important color is represented by the target color, by storing an important color such as a color of a corporate logo in advance.

In the density calculating apparatus according to the present invention, it is preferable that the place designating section gives a priority order to the plurality of places in descending order of the area of the place.

An important color frequently has a large area on the print image. According to the preferred density calculating apparatus, it is possible to easily obtain a printed matter where the important color is represented by the target color.

In the density calculating apparatus according to the present invention, it is preferable that the target color acquisition section acquires a color of the place on the print image when the print image is printed by another printing system different from the printing system, as the target color.

According to the preferred density calculating apparatus, it is possible to easily obtain a print image that matches with the color sample formed by another printing system.

In the density calculating apparatus according to the present invention, it is preferable that the target color acquisition section calculates a color of the place on the basis of a corresponding relationship between the print data and a color on the print image when the print image is printed by the another printing system, and acquires the color as the target color.

In the printing field, a print standard color profile showing a corresponding relationship between print data and a color of a print image, which is formed on the basis of the print data in a reference printing machine, has been widely used. In the preferred density calculating apparatus, a target color is acquired using the print standard color profile, so that it is possible to reproduce the print color in the reference printing machine.

In the density calculating apparatus according to the present invention, it is preferable that the target color acquisition section acquires a colorimetric value, which is obtained by performing a colorimetry of the place on a printed matter obtained by printing the print image by the another printing system, as the target color.

For example, colorimetric value of the place designated on the printed matter formed by the reference printing machine is acquired as the target color, so that it is possible to accurately achieve the same color as the color of the place designated on the printed matter.

The density calculating apparatus according to the present invention preferably further includes:

a displaying section that displays an expected image of a print image to be printed by the printing system on the basis of the print densities of the color materials, which have the plurality of colors and are calculated by the density calculation section, and the print image data.

Since the forecast image is displayed, it is possible to quantitatively confirm the print density or to confirm the finishing of the print image without actually performing printing.

The density calculating apparatus according to the present invention preferably further includes:

a storage section that stores a reference color of each patch which is obtained by printing the chart image while setting the print density of the printing system to a standard print density when a print color of an image printed on the basis of a predetermined image data becomes a predetermined standard color, as well as stores a corresponding relationship between a color difference and a density difference, the color difference being a difference between the reference color and a color of each patch obtained by printing the chart image while setting the print density of the printing system to a series of print densities changed from the standard print density for each of the color materials having the plurality of colors, and the density difference being a difference between the print density and the standard print density, wherein the color guess section receives the designation of the tentative print density of each of the color materials having the plurality of colors and the place, acquires a relating portion according to the place of the corresponding relationship stored in the storage section, and guesses a print color at the place by interpolation processing using the reference color of each patch and the relating portion.

For example, when the print densities of the C, M, Y, and K color materials are changed by every 13 steps, 28561 print densities are made through the combination thereof. If the print colors are forecasted for all of them and a corresponding relationship therebetween is stored, a huge amount of memory capacity is required. According to the preferred density calculating apparatus, the corresponding relationship between the color difference, which is obtained between the reference color of each patch and the reference color of the color of the patch, and the density difference with respect to the standard print density of the print density is stored. Accordingly, only the relating portion corresponding to the designated place is acquired, and the print color of the designate place is guessed while the tentative print density is set. Therefore, it is possible to suppress the increase of the memory capacity and the processing time, thereby guessing the print color.

In the density calculating apparatus according to the present invention, it is preferable that the density calculation section uniquely gives a solution x', which satisfies norm minimal solution and a least squares solution, of an exact solution obtained by solving a determinant $Ax=y$ (wherein, A is a matrix, x is a vector representing a density difference, and y is a vector representing a print color difference), which is stored in the storage section and corresponds to the corresponding relationship, with respect to x' to a determinant $x'=A'y$; obtains a solution of a density difference by substituting a difference between the target color and the color of the place with y of the determinant $x'=A'y$ by using a generalized inverse matrix A' of the matrix A; repeats the designation of the tentative print density for the color guess section and the receiving of the print color guessed by the color guess section with starting from a density, which is deviated from the standard density by the obtained density difference, as the tentative print density; and searches for a print density where the target color is achieved as a print color at the place.

For example, when an image is printed using four C, M, Y, and K color materials, X corresponds to four dimensions. When the measured values L*, a*, and b* are obtained through the colorimetry of the image by the colorimeter, Y corresponds to three dimensions. Therefore, there is no inverse matrix A− of the matrix A. However, it is possible to uniquely determine an approximate solution x' approaching the exact solution x by giving the condition for satisfying the norm minimal solution and a least squares solution. According to the preferred density calculating apparatus, the print density approaching the print density for achieving the target color is calculated by a generalized inverse matrix, and a print density for achieving the target color is actually searched for with starting from the calculated print density. Therefore, it is possible to reduce a problem corresponding to a local solution, and to quickly calculate the print density.

In the density calculating apparatus according to the present invention, it is preferable that when a plurality of target colors of the plurality of places is acquired in the target color acquisition section, the density calculation section makes simultaneous equations by substituting y of determinant $x'=A'y$ with the difference between the color of each place and a target color of the place, a solution of the density difference common to the plurality of target colors is obtained by solving the simultaneous equations, and a print density where the plurality of target colors is achieved as print colors at the plurality of places is searched for with starting from a density, which is deviated from the standard density by the obtained density difference, as the tentative print density.

Simultaneous equations representing a corresponding relationship for each of the several target colors are made and the print density common to the target colors is calculated by a generalized inverse matrix satisfying the simultaneous equations. Accordingly, even if several target colors are set, it is possible to efficiently calculate the print densities that achieve the target colors.

A density setting apparatus according to the present invention includes:

an image data acquisition section that acquires print image data representing a print image to be printed by a printing system, the printing system setting print densities of color materials having a plurality of colors and printing an image based on the image data by using the color materials in the print densities;

a place designating section that designates a place on the print image represented by the print image data acquired by the image data acquisition section;

a target color acquisition section that acquires a target color of a color of the place;

a color guess section that guesses a print color of the place to be printed by the printing system on the basis of a corresponding relationship between print densities and colors of patches, which patches are obtained by printing the chart image in each print density by the printing system based on the chart image data representing a chart image where patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density;

a density calculation section that calculates the print densities of the color materials having the plurality of colors by using the color guess section so that the target color acquired by the target color acquisition section is achieved at the place by the printing system based on the print image data; and a density setting section that sets the print densities of the color materials, which have the plurality of colors and are calculated by the density calculation section, to the printing system. According to the density setting apparatus of the present invention, it is possible to suppress of the generation of the waste sheets, and to easily adjust the print density of a color material without requiring a skilled technique.

Meanwhile, as for the density setting apparatus, a basic form has been shown herein, which is merely to avoid the overlapping. The density setting apparatus of the present invention includes not only the basic form but also various embodiments corresponding to the density calculating apparatus.

A density calculating program storage medium according to the present invention is a medium that stores a density calculating program executed in a computer, on the computer, the density calculating program building:

an image data acquisition section that acquires print image data representing a print image to be printed by a printing system, the printing system setting print densities of color materials having a plurality of colors and printing an image based on the image data by using the color materials in the print densities;

a place designating section that designates a place on the print image represented by the print image data acquired by the image data acquisition section;

a target color acquisition section that acquires a target color of a color of the place;

a color guess section that guesses a print color of the place to be printed by the printing system on the basis of a corresponding relationship between print densities and colors of patches, which patches are obtained by printing the chart image in each print density by the printing system based on the chart image data representing a chart image where patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density; and a density calculation section that calculates the print densities of the color materials having the plurality of colors by using the color guess section so that the target color acquired by the target color acquisition section is achieved at the place by the printing system based on the print image data.

Meanwhile, even as for the density calculating program storage medium, a basic form has been shown herein, which is merely to avoid the overlapping. The density calculating program storage medium of the present invention includes not only the basic form but also various embodiments corresponding to the density calculating program storage medium.

In addition, as for a component, which is the image data acquisition section is built on the computer system by the density calculating program of the present invention, one component may be composed of one program product or several components may be composed of one program product. Further, these components may be built by executing itself, or may be built by providing instruction to other programs or program part that includes the components.

A density calculating program storage medium according to the present invention is a medium that stores a density calculating program executed in a computer, on the computer, the density calculating program building:

an image data acquisition section that acquires print image data representing a print image to be printed by a printing system, the printing system setting print densities of color materials having a plurality of colors and printing an image based on the image data by using the color materials in the print densities;

a place designating section that designates a place on the print image represented by the print image data acquired by the image data acquisition section;

a target color acquisition section that acquires a target color of a color of the place;

a color guess section that guesses a print color of the place to be printed by the printing system on the basis of a corresponding relationship between print densities and colors of patches, which patches are obtained by printing the chart image in each print density by the printing system based on the chart image data representing a chart image where patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density;

a density calculation section that calculates the print densities of the color materials having the plurality of colors by using the color guess section so that the target color acquired by the target color acquisition section is achieved at the place by the printing system based on the print image data; and a density setting section that sets the print densities of the color materials, which have the plurality of colors and are calculated by the density calculation section, to the printing system. Meanwhile, even as for the density setting program storage medium, a basic form has been shown herein, which is merely to avoid the overlapping. The density setting program storage medium of the present invention includes not only the basic form but also various embodiments corresponding to the density setting program storage medium.

In addition, as for a component, which is the image data acquisition section is built on the computer system by the density setting program of the present invention, one component may be composed of one program product or several components may be composed of one program product. Further, these components may be built by executing itself, or may be built by providing instruction to other programs or program part that includes the components.

According to the present invention, it is possible to suppress the generation of the waste sheets, to easily adjust the print density of a color material without requiring a skilled technique.

DESCRIPTION OF THE PREFERRED EMBODIMENTS

An embodiment of the present invention will be described below with reference to the drawings.

Figure 1:
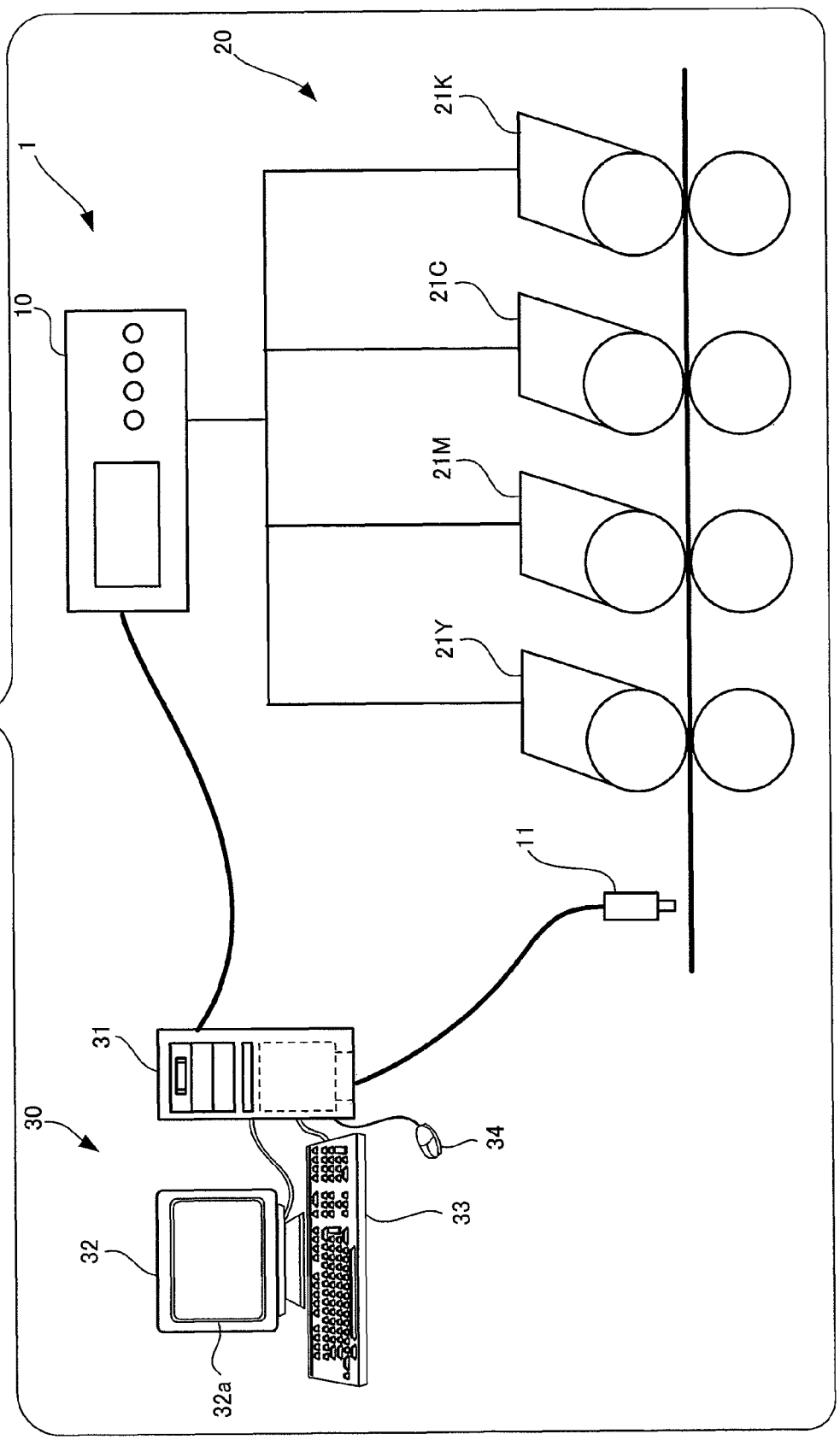
FIG. 1 is a view showing the entire structure of a printing system to which an embodiment of the present invention is applied.

FIG. 1 is a view showing the entire structure of a printing system to which an embodiment of the present invention is applied.

A printing system 1 shown in FIG. 1 mainly includes a printing machine 20 that forms a print image using C, M, Y, and K color ink materials; a workstation 30 that generates print image data for representing a print image by editing an image; a control device 10 that controls the print densities of C, M, Y, and K color ink materials in the printing machine 20; and a colorimeter that performs the colorimetry of the print image. Meanwhile, a color scanner that scans a document image or a printer that prints an image on the basis of image data is actually connected to the printing system 1, but is omitted in the drawing.

R, G, and B color separated image data that are obtained by scanning a document by the color scanner (not shown); four C, M, Y, and K color separated image data that are made by a personal computer or the like; or three L*, a*, and b* color separated image data that are obtained by taking a photograph of a subject by a digital camera are input to the workstation 30. Electronic page-makeup based on the input color separated image data is performed in the workstation 30 by an operator, so that print image data representing image pages for printing are generated. Meanwhile, the printing machine 20 shows images by pixel groups. Dot percentage data of C, M, Y, and K colorplates, which show images by pixel groups having dot percentages in the range of 0 to 100%, are used as the print image data. Generated print image data are sent to the printing machine 20.

The printing machine 20 is provided with a CTP (not shown) that generates C, M, Y, and K color printing plates; and image forming sections 21Y, 21M, 21C, and 21K that form C, M, Y, and K color plate images on a paper sheet by mounting printing plates thereon and by applying ink materials to the printing plates. A colorimeter 11, which performs the colorimetry of the print image formed on the paper sheet, is provided on the downstream side of the image forming sections 21Y, 21M, 21C, and 21K. If the print image data are transmitted to the printing machine 20, C, M, Y, and K color printing plates are generated on the basis of the print image data and mounted on the image forming sections 21Y, 21M, 21C, and 21K. In the image forming sections 21Y, 21M, 21C, and 21K, ink materials of which the print densities are controlled by the control device 10 are applied to the printing plates, and the ink materials are sequentially transferred onto the paper sheet so that C, M, Y, and K color plate images are formed on the paper sheet and are sequentially superimposed. Accordingly, a print image is formed.

In this case, the degree of light reflection on the surface of a paper sheet varies depending on the kinds of print media, such as a newspaper, an advertising matter, and a magazine. Accordingly, even though the same amount of the same color ink is supplied, the impression of the color of the completed print image varies. However, the color of a corporate logo does need to be always represented by the same color. For this reason, for important colors of a print image, the initial print densities of C, M, Y, and K color ink materials of the printing machine 20 are calculated in the workstation 30. The calculated initial print densities are transmitted to the control device 10, and the open or closed state of an ink reservoir of each of the image forming sections 21Y, 21M, 21C, and 21K is adjusted by the control device 10, so that the print density of each of the ink materials is set to the initial print density.

If the initial print densities of the ink materials are set, test printing is performed in the image forming sections 21Y, 21M, 21C, and 21K, and the color of the print image formed by the test printing is measured by the colorimeter 11, and the test printing is repeated while the print densities of the ink materials are finely adjusted in the control device 10. When a colorimetric value transmitted from the colorimeter 11 reaches a target color and the print densities of the ink materials are stabilized, a printing start signal is transmitted from the workstation 30 to the control device 10 and is converted into a test printing signal. Therefore, actual printing is performed. Since the initial print density of the ink is set to a value approaching a target print density for achieving a target color in this embodiment, the time required until the stabilization of the print density of the ink is shortened. As a result, the occurrence of spoilage is suppressed.

Herein, the contents of the processing performed by the workstation 30 will be described in detail below.

The workstation 30 is a large personal computer. As shown in FIG. 1, the workstation includes a main body device 31, in appearance, an image displaying device 32 that displays an image on a display screen 32a according to an instruction transmitted from the main body device 31, a keyboard 33 that is used to input various kinds of information corresponding to the key operation to the main body device 31, and a mouse 34 that is used to input an instruction corresponding to an icon displayed at an arbitrary position on the display screen 32a by designating the arbitrary position.

Figure 2:
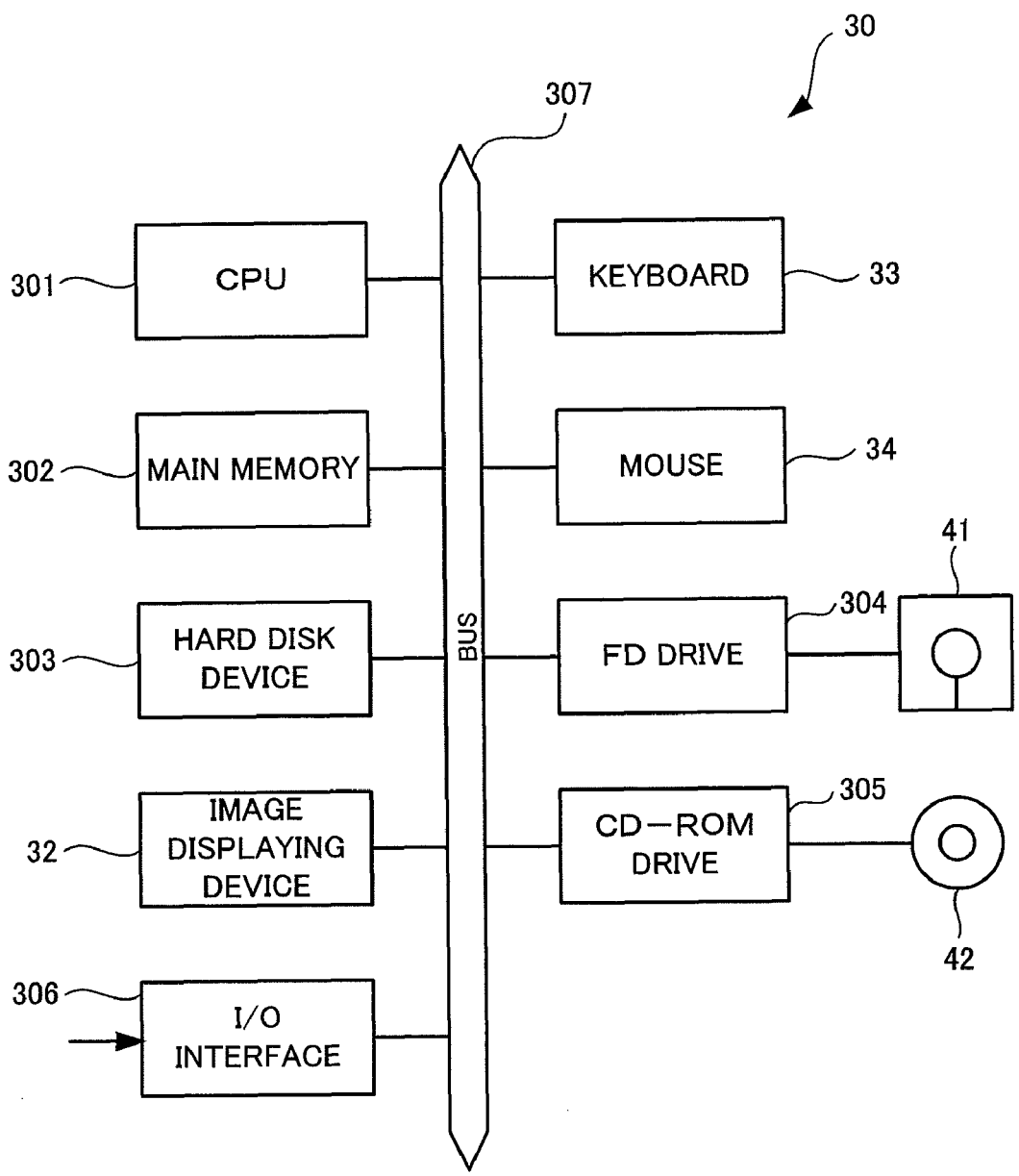
FIG. 2 is a view showing the structure of hardware of a workstation.

FIG. 2 is a view showing the structure of hardware of a workstation.

As shown in FIG. 2, a CPU 301 that executes various programs, a main memory 302 where the program stored in a hard disk device 303 is read out and developed to be executed by the CPU 301, a hard disk device 303 where various programs or data are stored, a FD drive 304 that loads a FD 41 thereon and has access to the FD 41, a CD-ROM drive 305 that has access to a CD-ROM 42, and an I/O interface 306 that receives image data from a management server 20 and sends various instruction data to the management server 20 are provided in the main body device 31 of the workstation 30. These various components, the image displaying device 32, the keyboard 33, and the mouse 34, which are shown in FIG. 1, are connected to one another by a bus 307.

In this case, a print density adjusting program 100 (see FIG. 3), which is an embodiment of each of a density calculating program and a density setting program of the present invention, is stored in the CD-ROM 42.

Figure 3:
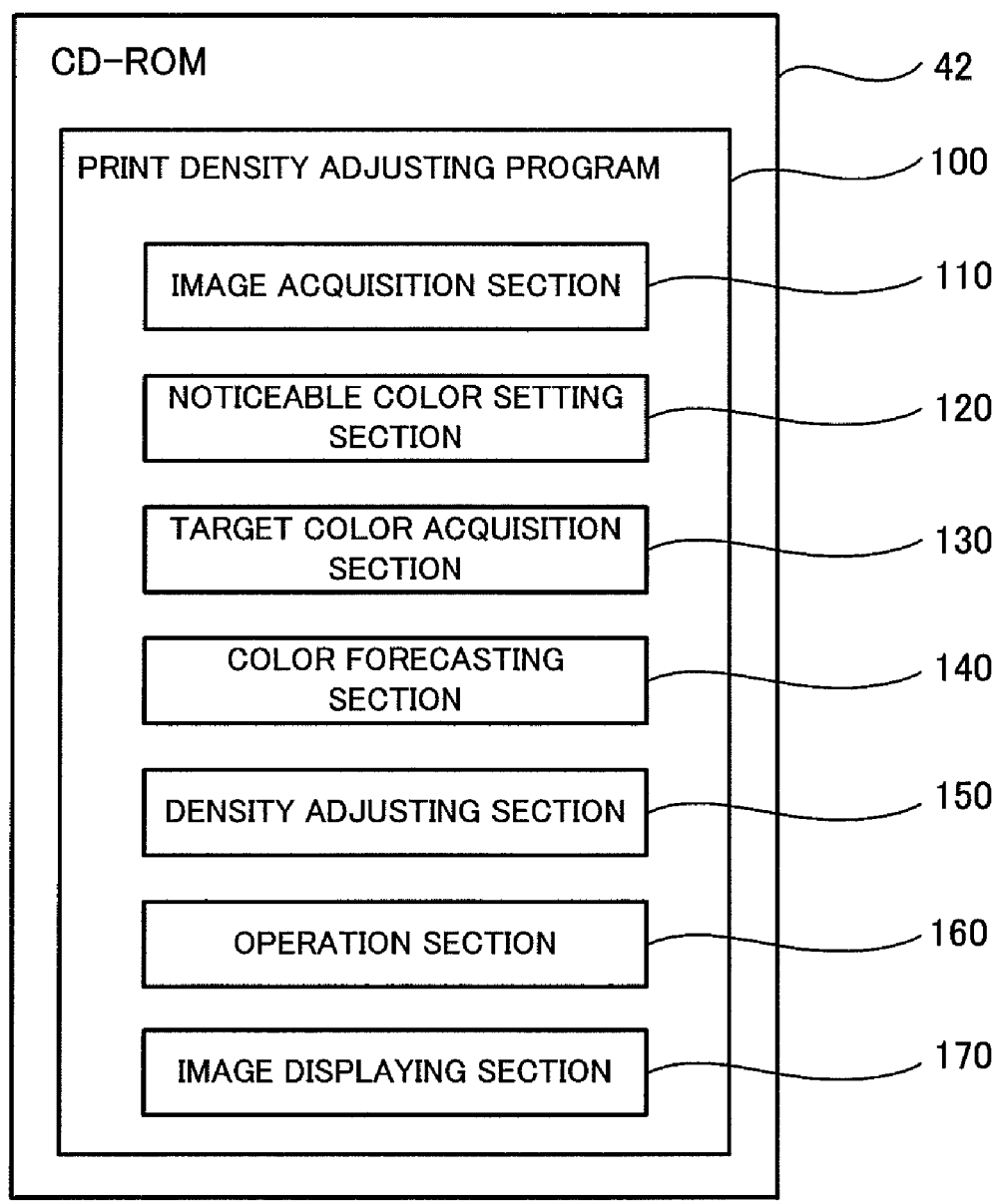
FIG. 3 is a conceptual diagram of a CD-ROM.

FIG. 3 is a conceptual diagram of the CD-ROM 42.

As shown in FIG. 3, the print density adjusting program 100 stored in the CD-ROM 42 includes an image acquisition section 110, a noticeable color setting section 120, a target color acquisition section 130, a color forecasting section 140, a density adjusting section 150, an operation section 160 and image displaying section 170.

The CD-ROM 42 is loaded on the CD-ROM drive 305 of the workstation 30, and the print density adjusting program 100 stored in the CD-ROM 42 is uploaded to the workstation 30 and stored in the hard disk device 303. Further, if the print density adjusting program 100 starts and is executed, a print density adjusting apparatus 200 (see FIG. 4), which is an embodiment of each of a density calculating apparatus and a density setting apparatus of the present invention, is formed in the workstation 30

Meanwhile, the CD-ROM 42 has been exemplified in the above description as a storage medium that stores the print density adjusting program 100. However, a storage medium that stores the print density adjusting program 100 is not limited to the CD-ROM, and may be a storage medium, such as an optical disk, a MO, a FD, or a magnetic tape in addition to this. Further, the print density adjusting program 100 may be directly provided to the workstation 30 through an I/O interface 306 without a storage medium.

The details of each part of the print density adjusting program 100 will be described together with the operation of each part of the print density adjusting apparatus 200.

Figure 4:
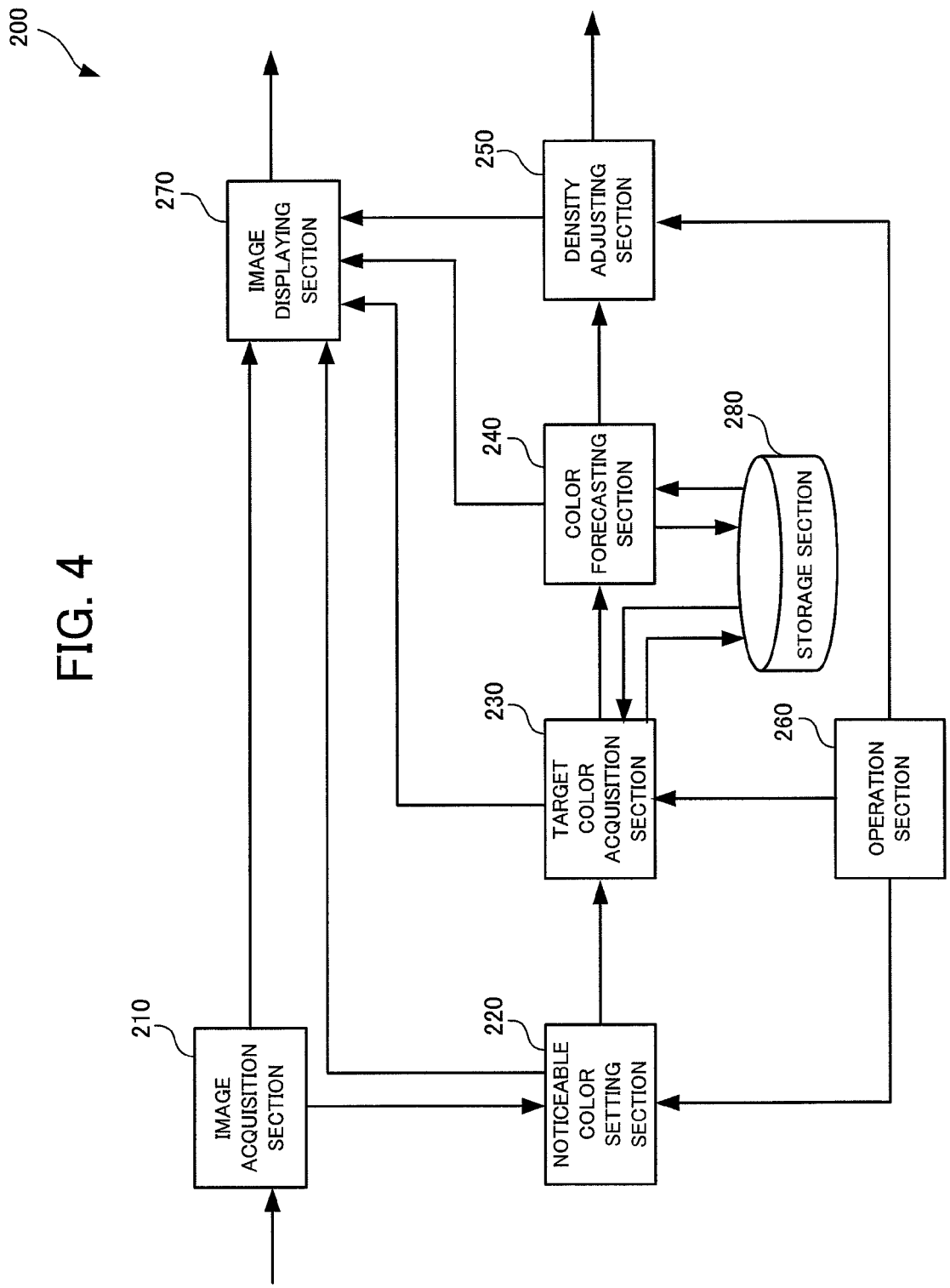
FIG. 4 is a functional block diagram of a print density adjusting apparatus.

FIG. 4 is a functional block diagram of the print density adjusting apparatus 200.

The print density adjusting apparatus 200 includes an image acquisition section 210, a noticeable color setting section 220, a target color acquisition section 230, a color forecasting section 240, a density adjusting section 250, an operation section 260, an image displaying section 270, and a storage section 280.

The image acquisition section 210, the noticeable color setting section 220, the target color acquisition section 230, the color forecasting section 240, the density adjusting section 250, the operation section 260, and the image displaying section 270 of the print density adjusting apparatus 200 correspond to the image acquisition section 110, the noticeable color setting section 120, the target color acquisition section 130, the color forecasting section 140, the density adjusting section 150, the operation section 160, and the image displaying section 170 of the print density adjusting program 100 shown in FIG. 3, respectively.

The components of FIG. 4 are different from those of FIG. 3 in that each of the components shown in FIG. 4 is composed of the combination of an OS and application programs that are executed by hardware of the computer and the computer, but each of the components of the print density adjusting program 100 shown in FIG. 3 is composed of only application programs thereof.

Figure 5:
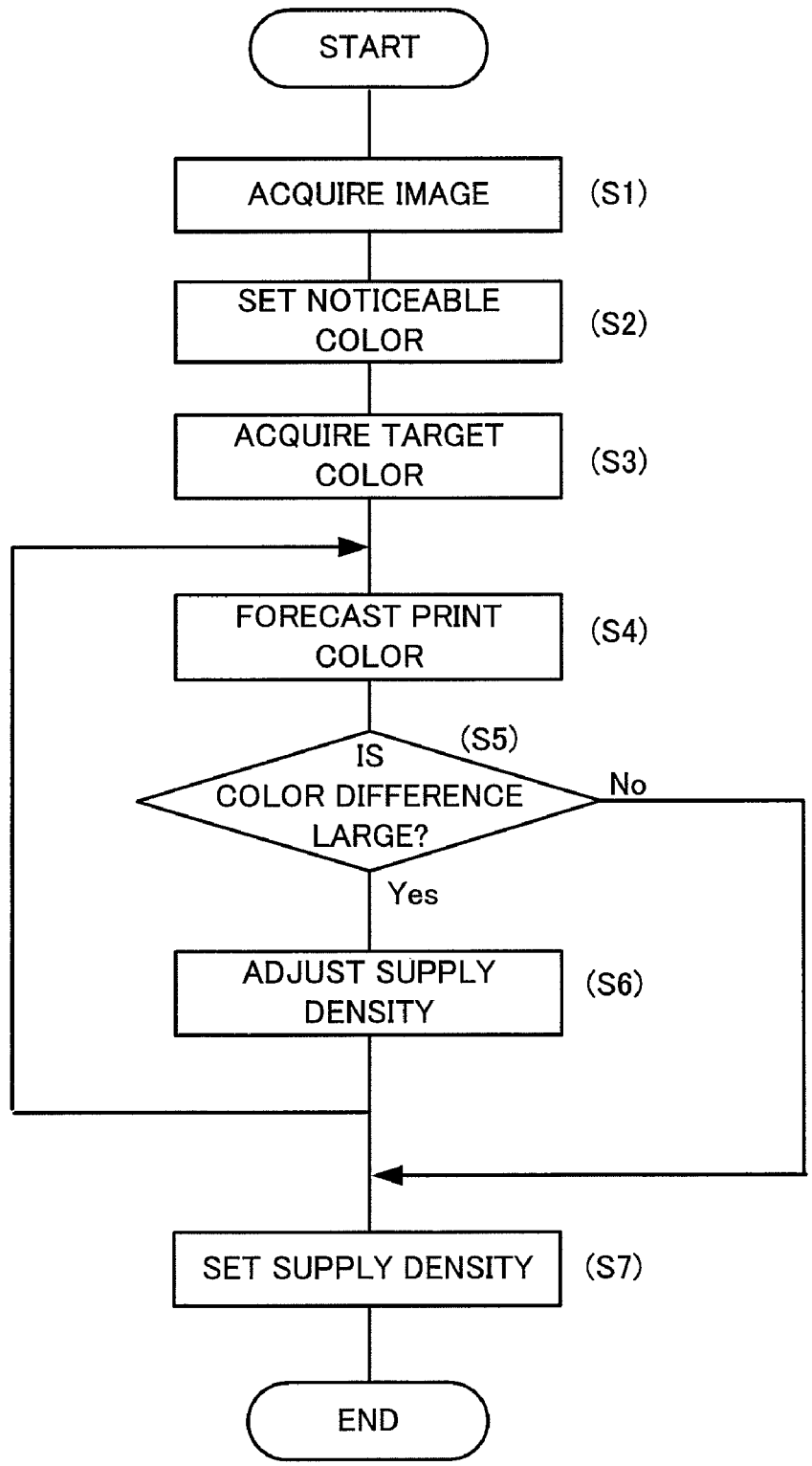
FIG. 5 is a flowchart illustrating a series of processing until the print density of an ink material is set.

FIG. 5 is a flowchart illustrating a series of processing until the print density of an ink material is set in the print density adjusting apparatus 200 shown in FIG. 4.

Hereinafter, the operation of each component of the print density adjusting apparatus 200 shown in FIG. 4 will be described in accordance with the flowchart of FIG. 5, together with each component of the print density adjusting program 100 shown in FIG. 3.

The print image data, which is edited using a personal computer or the like by an operator, is acquired by the image acquisition section 210 of FIG. 4 (Step S1 of FIG. 5). As described above, in this embodiment, dot percentage data of C, M, Y, and K color plates, which show images by pixel groups having dot percentages in the range of 0 to 100%, are acquired as the print image data. The image acquisition section 210 corresponds to an example of an image data acquisition section of the present invention. The acquired print image data are transmitted to the noticeable color setting section 220 and the image displaying section 270.

The image displaying section 270 displays a noticeable color setting screen, which is used to set important noticeable colors of the colors of the pixels of the print image (that is, a place of the print image) for representing the print image data, on the display screen 32a of FIG. 1.

Figure 6:
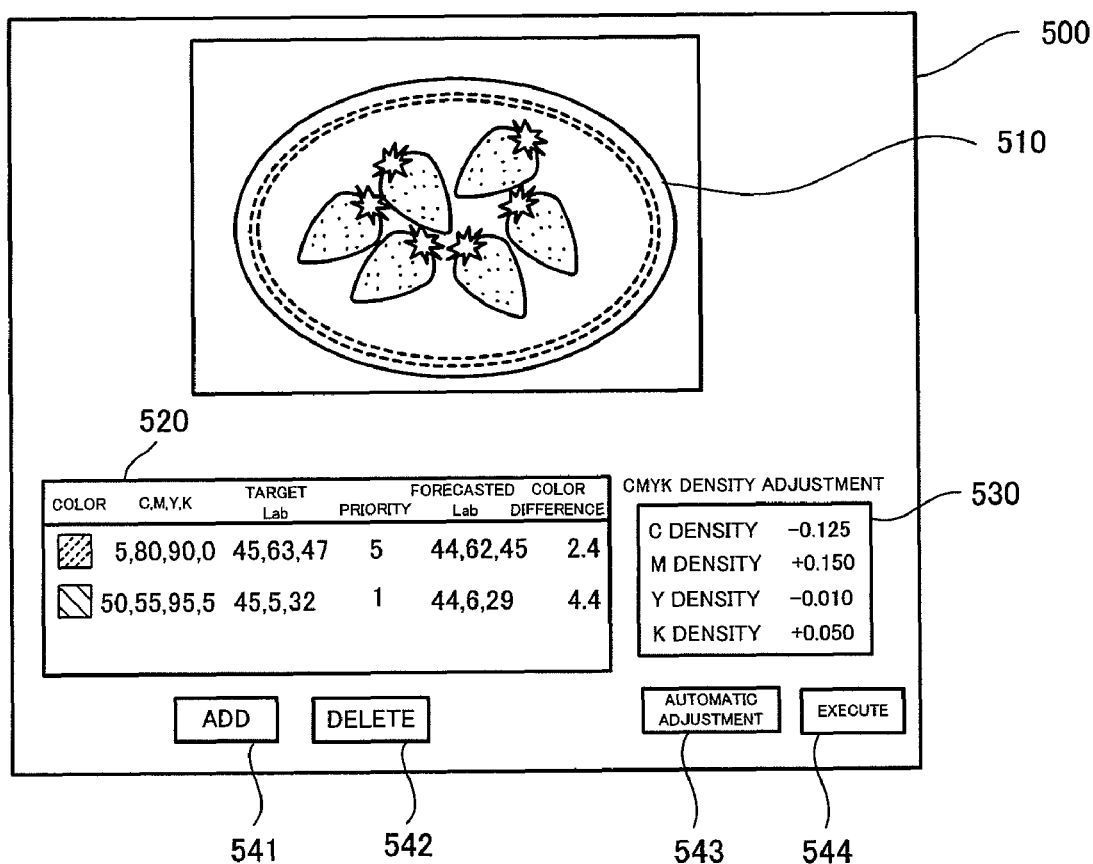
FIG. 6 is a view showing an example of a noticeable color setting screen.

FIG. 6 is a view showing an example of the noticeable color setting screen.

A noticeable color setting screen 500 shown in FIG. 6 includes a print image 510 represented by the print image data, a color information displaying section 520 that shows information relating to a noticeable color set using the noticeable color setting screen 500, a manual density adjusting section 530 that is used to manually adjust the print density of an ink material in the printing machine 20, an ADD button 541 that is used to add a noticeable color, a DELETE button 542 that is used to delete a noticeable color, an automatic adjustment button 543 that is used to begin to calculate the initial print density of an ink material, and an EXECUTE button 544 that is used to execute the setting of the print density of an ink material on the printing machine 20.

If a user selects the ADD button 541 by using the mouse 34 or the like, a designation method selecting screen used to select a method of designating a noticeable color is displayed on the display screen 32a of FIG. 1.

Figure 7:
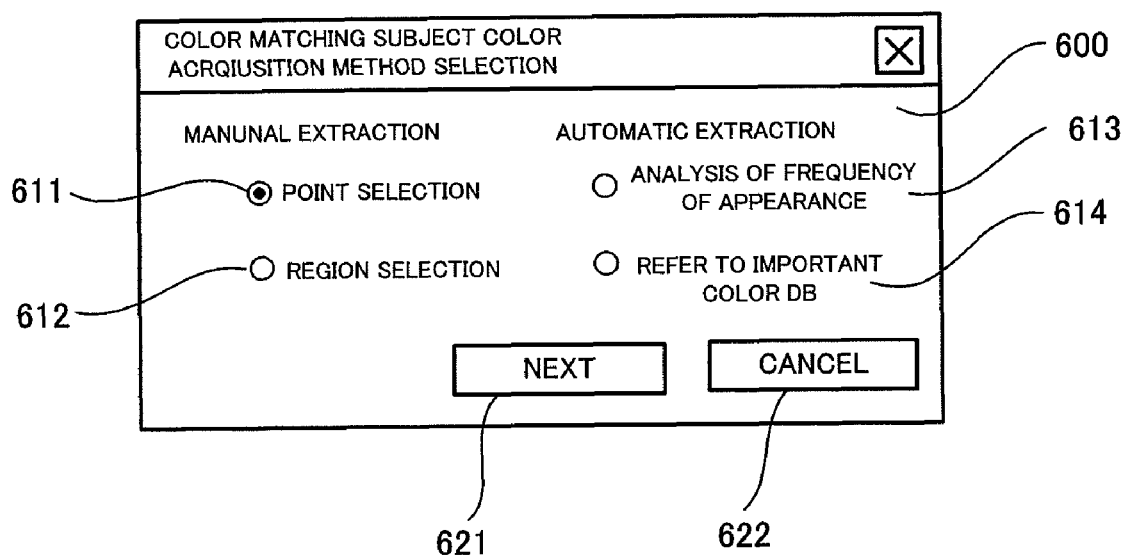
FIG. 7 is a view showing an example of a designation method selecting screen.

FIG. 7 is a view showing an example of the designation method selecting screen.

The designation method selecting screen 600 includes various radio buttons that are used to manually designate noticeable colors, various radio buttons that are used to automatically designate noticeable colors, a NEXT button 621 that is used to display the information of the designated noticeable colors, and a CANCEL button 622 that is used to cancel the setting. A point selecting radio button 611 that is used to designate a color of the point as a noticeable color by selecting a point on a print image 510 shown in FIG. 6, and a region radio button 612 that is used to designate an average value or a mode value of a color of a region as a noticeable color by selecting the region on the print image 510 shown in FIG. 6 are provided as the radio buttons that are used to manually designate noticeable colors. A frequency analysis radio button 613 that is used to designate a color, which frequently appears in the print image 510, as a noticeable color; and a DB checking radio button 614 that is used to designate important colors, which are previously stored in the storage section 280 shown in FIG. 4, as noticeable colors are provided as the radio buttons that are used to automatically designate noticeable colors.

If a user selects the point selecting radio button 611 or the region radio button 612 and then selects the NEXT button 621 by using the mouse 34 or the like, the noticeable color setting screen 500 shown in FIG. 6 is displayed again.

If a noticeable point is selected on the print image 510 of the noticeable color setting screen 500 while the point selecting radio button 611 is selected, the position information of the noticeable portion is transmitted from the operation section 260 shown in FIG. 4 to the noticeable color setting section 220. The dot percentage data that represents a noticeable portion represented by the position information, which is transmitted from the operation section 260, of the print image data is acquired in the noticeable color setting section 220. Further, the color represented by the dot percentage data is provisionally set as a noticeable color.

Further, if a region including important colors is selected on the print image 510 of the noticeable color setting screen 500 while the region radio button 612 is selected, the position information of the region is transmitted from the operation section 260 of FIG. 4 to the noticeable color setting section 220. The dot percentage data in a region represented by the position information, which is transmitted from the operation section 260, of the print image data is acquired in the noticeable color setting section 220. Further, the average color of colors represented by the dot percentage data is provisionally set as a noticeable color.

When a noticeable color is provisionally set, the display of a set color information screen, which displays the information of the noticeable color, is instructed from the noticeable color setting section 220 to the image displaying section 270. Accordingly, the set color information screen is displayed on the display screen 32a.

Figure 8A:
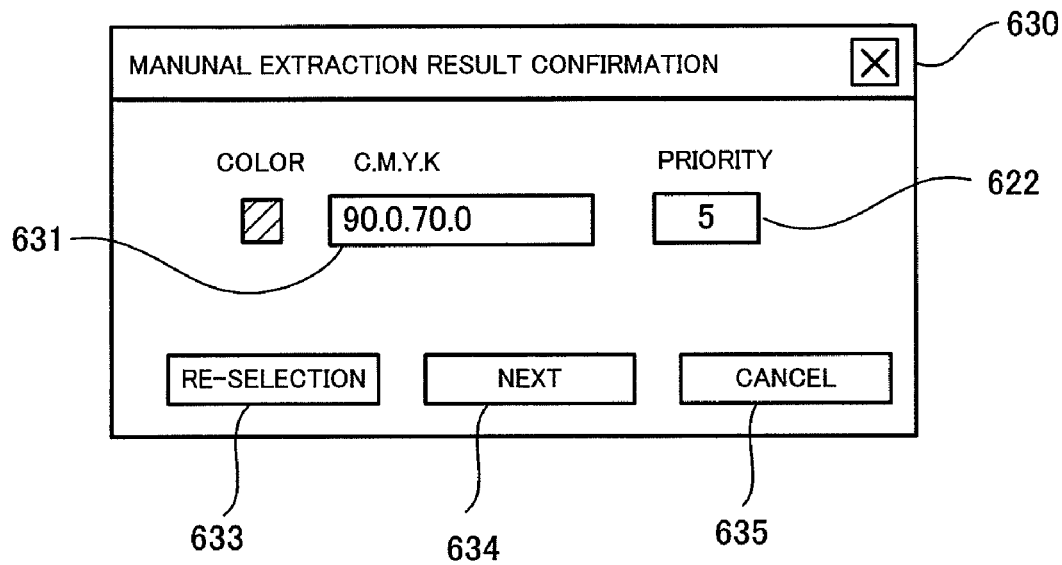
FIG. 8 is a view showing an example of a set color information screen.

FIGS. 8A and 8A are views showing an example of the set color information screen.

FIG. 8A shows an example of a provisionally set color information screen 630 that displays the information of the noticeable color provisionally set by the noticeable color setting screen 500. A color value displaying section 631 that displays dot percentages of C, M, Y, and K colors of the provisionally set noticeable color; a priority setting section 632 that is used to set the priority of the noticeable color; a reselection button 633 that is used to return to the noticeable color setting screen 500 and to reselect a noticeable color; a CANCEL button 635 that is used to cancel the setting of the noticeable color; and a NEXT button 634 that is used to determine the noticeable color and to set a target color of the noticeable color are provided on the provisionally set color information screen 630.

The dot percentage of the noticeable color, which is provisionally set in the noticeable color setting section 220, is displayed on the color value displaying section 631. However, a user can manually and finely adjust a dot percentage. Further, in this embodiment, the priorities set in the priority setting section 632 correspond to five steps, that is, first to fifth steps. As the numerical value is increased, the priority becomes high.

The noticeable color is manually set as described above.

Furthermore, if a user selects the frequency analysis radio button 613 or the DB checking radio button 614, which is a radio button used to automatically designate a noticeable color, on the designation method selecting screen 600 of FIG. 7 and then selects the NEXT button 621, the contents of the selection are transmitted from the operation section 260 to the noticeable color setting section 220.

If the frequency analysis radio button 613 is selected, several dot percentages, which represent all pixels on the print image of the print image data, are analyzed in the noticeable color setting section 220. Accordingly, the total number of pixels having the same dot percentage is calculated. In addition, the dot percentage, which corresponds to the large calculated total number, is selected as a predetermined numeral (two in this embodiment), and the color represented by the selected dot percentage is provisionally set as a noticeable color.

If the DB checking radio button 614 is selected, the information about the important colors previously stored in the storage section 280 is acquired in the noticeable color setting section 220 and the important colors are provisionally set as noticeable colors. Not only a flesh color, a gray color, and the like, which determine the impression of a printed matter, but also the color of a corporate logo, a corporate color, and the color of a product are stored as the important colors.

When a noticeable color is set, the display of the set color information screen, which displays the information of the noticeable color, is instructed from the noticeable color setting section 220 to the image displaying section 270. Accordingly, the set color information screen is displayed on the display screen 32a.

Figure 8B:
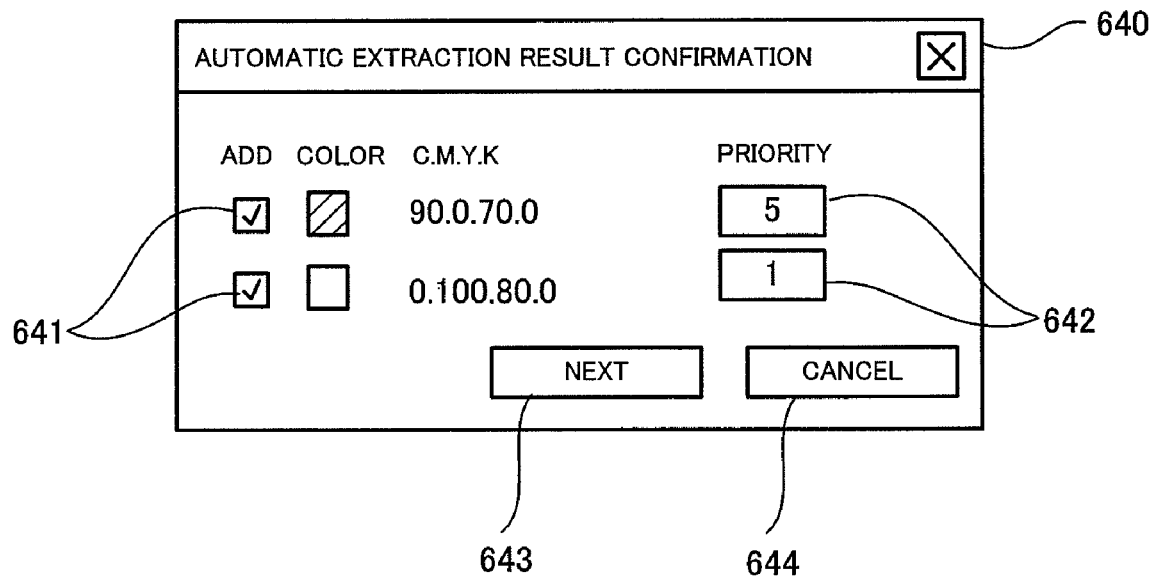

FIG. 8B shows an example of an automatically set color information screen 640 that displays the information of the noticeable color automatically and provisionally set by the noticeable color setting screen 500. Priority setting sections 642 that display the dot percentages of the set noticeable colors and are used to set the priorities of the noticeable colors, check boxes 641 that are used to determine the addition of noticeable colors, a CANCEL button 644 that is used to cancel the setting of the noticeable colors, and a NEXT button 643 that is used to set target colors of the noticeable colors are provided on the automatically set color information screen 640.

The noticeable color is automatically set as described above.

If a user selects the NEXT buttons 634 and 643 shown in FIG. 8 by using the mouse 34 or the like, the setting contents set on the provisionally set color information screen 630 or the automatically set color information screen 640 are transmitted from the operation section 260 to the noticeable color setting section 220. The noticeable color setting section 220 sets the color, which is represented by the final dot percentage included in the transmitted setting contents, as a noticeable color. The combination of the operation section 260 and the noticeable color setting section 220 corresponds to an example of a point designating section in the present invention. The information of the set noticeable color is transmitted to the target color acquisition section 230.

When the information of the noticeable color is transmitted, the display of a target color selecting screen, which is used to select a target color acquisition method, is instructed from the target color acquisition section 230 to the image displaying section 270. Accordingly, the target color selecting screen is displayed on the display screen 32a.

Figure 9:
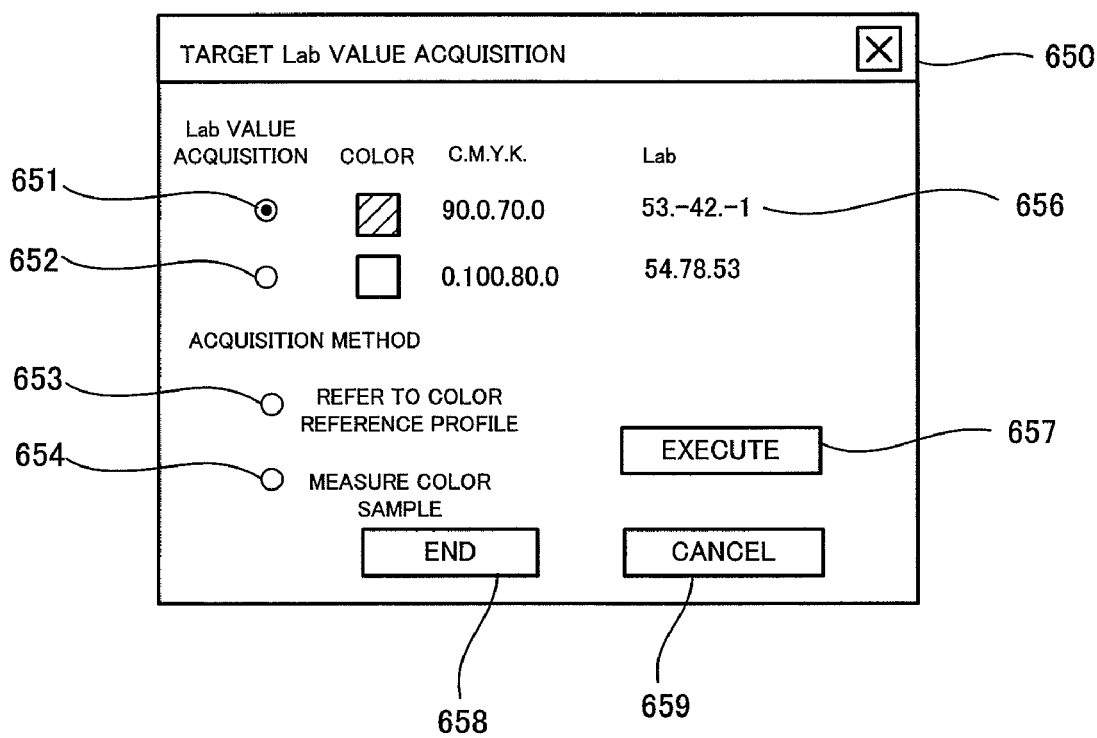
FIG. 9 is a view showing an example of a target color selecting screen.

FIG. 9 is a view showing an example of the target color selecting screen.

The target color selecting screen 650 includes radio buttons 651 and 652 that display the dot percentages of the set noticeable colors and are used to select noticeable colors for the acquisition of target colors, a profile radio button 653 that is used to acquire the target colors by using a color reference profile, a color sample radio button 654 that is used to acquire the target colors by performing the colorimetry of color samples, an EXECUTE button 657 that is used to instruct a target color to be acquired, an END button 658 that is used to transmit a fact that target colors of all noticeable colors are acquired, a CANCEL button 659 that is used to instruct the acquisition of the target color to be cancelled, and a target color displaying section 656 on which the acquired target color is displayed.

If several noticeable colors are set in this embodiment, target colors are sequentially acquired one by one from the noticeable colors selected by using the radio buttons 651 and 652. Further, the color reference profile, which represents a corresponding relationship between print data (dot percentages of C, M, Y, and K colors) and the colors (values of L*, a*, and b*) of a print image formed by the reference printing machine on the basis of the print data, is previously stored in the storage section 280. In addition, there are provided color samples that are printed by the reference printing machine on the basis of the print image data.

If a user selects the profile radio button 653 by using the mouse 34 and then selects the EXECUTE button 657, the colors (values of L*, a*, and b*) of a print image corresponding to the dot percentages of the noticeable colors are acquired in the target color acquisition section 230 with reference to the color reference profile stored in the storage section 280, and the acquired colors (values of L*, a*, and b*) of the print image are provisionally set as target colors.

Further, if a user selects the color sample radio button 654 by using the mouse 34 and then selects the EXECUTE button 657, the display of a color sample measuring auxiliary screen is instructed from the target color acquisition section 230 to the image displaying section 270. Accordingly, the color sample measuring auxiliary screen is displayed on the display screen 32a.

Figure 10:
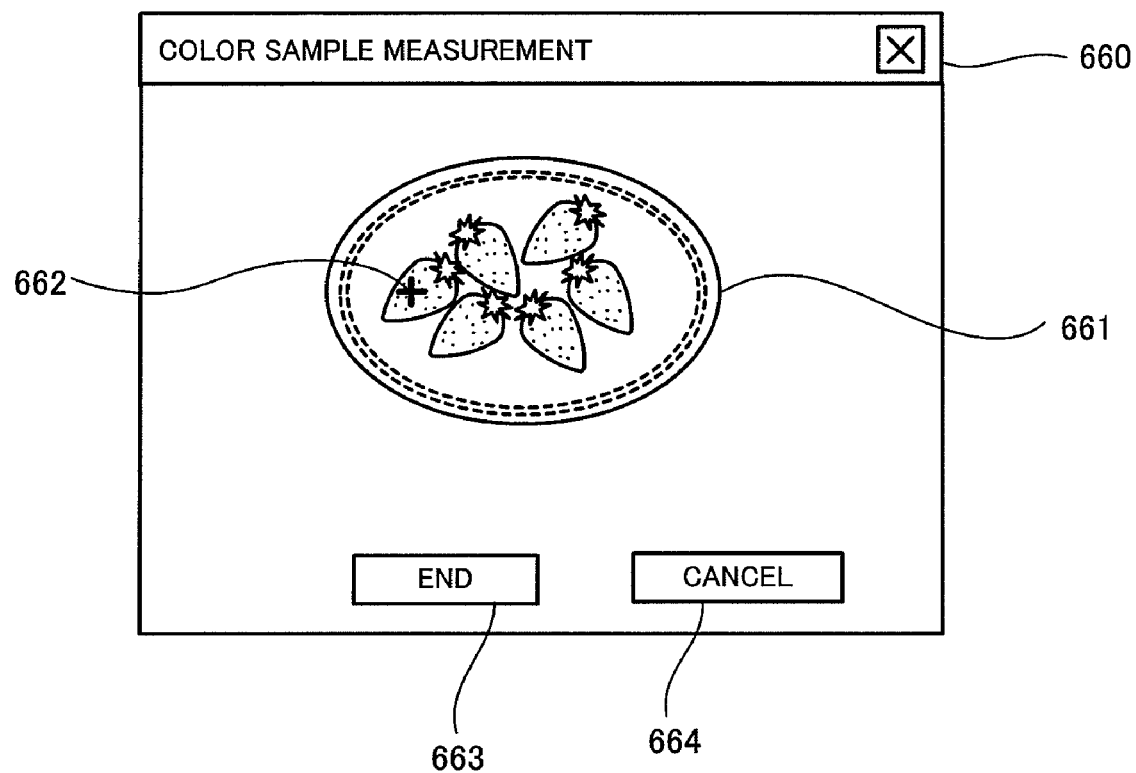
FIG. 10 is a view showing an example of a color sample measuring auxiliary screen.

FIG. 10 is a view showing an example of the color sample measuring auxiliary screen.

The color sample measuring auxiliary screen 660 displays a print image 661 represented by the print image data, and highlights a point 662 on which a noticeable color is set on the print image 661. Further, if a user connects the colorimeter to the workstation 30 and sets the colorimeter at a position corresponding to the point 662 highlighted on a previously provided color sample, the colorimetry of the color of the position is performed and the colorimetric values (values of L*, a*, and b*) are transmitted to the target color acquisition section 230 through the I/O interface 306 of FIG. 2. In the target color acquisition section 230, the transmitted colorimetric colors are provisionally set as target colors.

If the target colors are provisionally set, the provisionally set target colors are displayed on the target color displaying section 656 of the target color selecting screen 650 shown in FIG. 9.

If target colors are provisionally set with respect to all noticeable colors displayed on the target color selecting screen 650 and a user selects the END button 658 by using the mouse 34, the provisionally set target colors are determined as final target colors in the target color acquisition section 230 (Step S3 of FIG. 5). The target color acquisition section 230 corresponds to an example of a target color acquisition section in the present invention. The determined target colors are transmitted to the color forecasting section 240.

Further, when the target colors are determined, the noticeable color setting screen 500 shown in FIG. 6 is displayed again on the display screen 32a shown in FIG. 1. If a user selects the automatic adjustment button 543 by using the mouse 34, the initial print density of an ink material begins to be calculated. First, a decision selecting screen is displayed. The decision selecting screen is used to select a decision condition for deciding that a print color of a noticeable color, when the print image is formed in the printing machine 20 on the basis of the print image data, is adjusted into a target color of the noticeable color.

Figure 11:
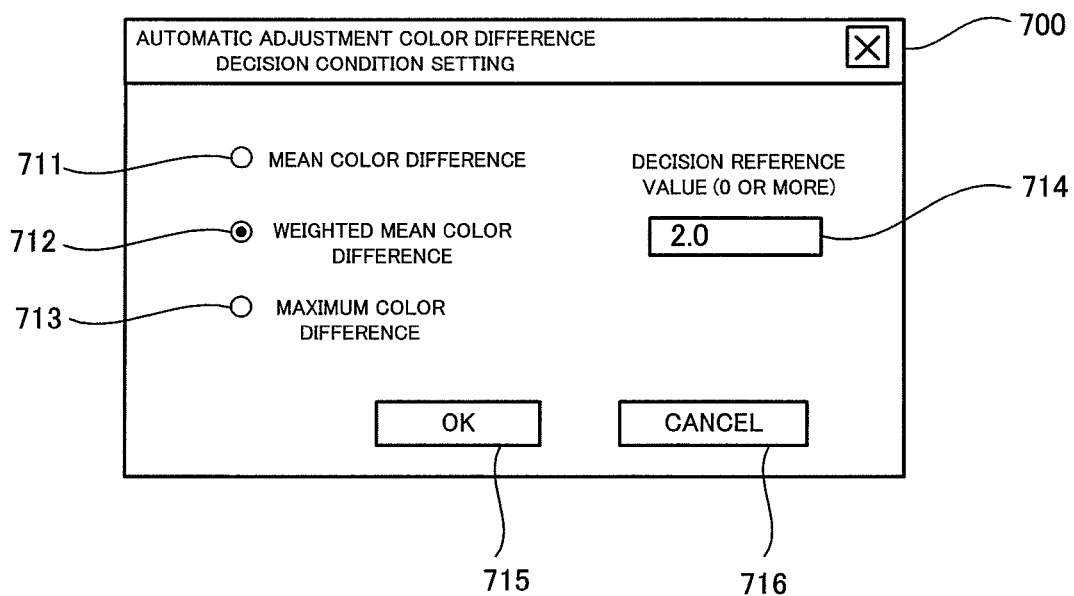
FIG. 11 is a view showing an example of a decision selecting screen.

FIG. 11 is a view showing an example of the decision selecting screen.

A color difference input section 714 where a decision criterion of a color difference, when it is decided that the print color is adjusted into the target color, is input; a mean color difference radio button 711 that is used to make a decision by using the mean color difference of noticeable colors; a weighted mean color difference radio button 712 that is used to make a decision by using the mean color difference weighted according to each of the noticeable colors; a maximum color difference radio button 713 that is used to make a decision by using the largest color difference of the color differences of the noticeable colors; an OK button 715 that is used to fix the setting contents; and a CANCEL button 716 that is used to cancel the setting are provided on the decision selecting screen 700.

If a user selects the color difference of the decision criterion and the kind of the color difference to be used by using the mouse 34, the contents of the selection are transmitted from the operation section 260 to the color forecasting section 240.

The initial print density of an ink material begins to be calculated in the color forecasting section 240.

First, a print color of a noticeable color, when the print image is formed in the printing machine 20 on the basis of the print image data, is forecasted (Step S4 in FIG. 5).

The description of the flowchart of FIG. 5 is stopped once, and a method of forecasting a print color will be described herein.

Prior to printing, when a print image is formed on the basis of print image data where the dot percentages of C, M, Y, and K colors are 100%, the print densities of the ink materials of the printing machine 20 are set to standard print densities where the colors of the print image become previously determined standard colors in the control device 10. In the following description, a state where the print densities of the ink materials are set to the standard print densities is referred to as a standard state.

If a printing machine 20 is set to a standard state, a chart image where several patches having different colors line up is printed in the printing machine 20 on the basis of previously provided chart image data and the colorimetry of each of the patches is performed by a colorimeter.

Then, while the print densities of the C, M, Y, and K color ink materials have been independently changed into −0.2, −0.1, +0.1, and +0.2 with respect to the standard print densities, respectively, the chart image is printed on the basis of the chart image data. In the following description, a state where the print densities of the ink materials are changed from the standard print densities is referred to as a changed state. In this embodiment, the C, M, Y, and K colors are set to the changed states of "standard print density −0.2", "standard print density −0.1", "standard print density +0.1", and "standard print density +0.2", respectively. Accordingly, a total of 16 chart images are printed. The colorimetry of each patch of the formed chart images is also performed.

Herein, when the print densities of the C, M, Y, and K color ink materials are changed by a desired variation with respect to the standard print densities, respectively, the print color R of the patch can be approximately obtained as follows:

$$R = R_{(std)} + R_{\Delta C} + R_{\Delta M} + R_{\Delta Y} + R_{\Delta K} \quad (1)$$

In this case, the colorimetric value of the patch printed by a printing machine 20 is $R_{(std)}$, a difference between the colorimetric value of the patch when the print density of only the C color ink is changed and the colorimetric value of the patch printed with the standard print density is $R_{\Delta C}$, a difference between the colorimetric value of the patch when the print density of only the M color ink is changed and the colorimetric value of the patch printed with the standard print density is $R_{\Delta M}$, a difference between the colorimetric value of the patch when the print density of only the Y color ink is changed and the colorimetric value of the patch printed with the standard print density is $R_{\Delta Y}$, and a difference between the colorimetric value of the patch when the print density of only the K color ink is changed and the colorimetric value of the patch printed with the standard print density is RΔK. Colorimetric values, which are obtained by the colorimetry of each of the patches of the chart image printed in the standard state and the total of 16 chart images printed in the changed states, are substituted in Expression (1), so that a corresponding relationship between the print density of an ink material (standard print density±variation) and the print color R of the patch is obtained for each patch. That is, the print color of the patch can be forecasted from the dot percentage of the patch and the print density of an ink material. Further, the print color R, which corresponds to the minute variation of the print density of the ink, is also calculated by performing interpolation processing on the print density of the ink. In addition, the print colors R, which corresponds to several colors, are also calculated by performing the interpolation processing on the dot percentages of the patches.

A corresponding relationship among the dot percentage of the original color calculated as described above, the print density of the ink, and the forecast print color is stored in the storage section 280.

In Step S4 of FIG. 5, the tentative print density of the ink common to the noticeable colors is determined in the color forecasting section 240 shown in FIG. 4, and the print colors of the noticeable colors, which correspond to the tentative print density of the ink and the dot percentages of the noticeable colors, are acquired on the basis of the corresponding relationship stored in the storage section 280.

The print color of the noticeable color is forecasted as described above.

If the print color is forecasted, it is decided whether the color difference between the print color and a target color is larger than a reference color difference (Step S5 of FIG. 5). If only one noticeable color is set, the color difference between the target color and the print color is determined as the color difference of a decision subject as it is. When the mean color difference radio button 711 is selected on the decision selecting screen 700 shown in FIG. 11 if several noticeable colors are set, an average value of the color differences between a target color and the print colors of the noticeable colors is determined as a color difference of the decision subject. When the weighted mean color difference radio button 712 is selected thereon if several noticeable colors are set, a weighted average value is calculated by weighting the color differences between a target color and the print colors of the several noticeable colors so that the color difference having a higher priority is highly weighted, and the calculated weighted average value is determined as a color difference of the decision subject. When the maximum color difference radio button 713 is selected thereon if several noticeable colors are set, the maximum color difference of the color differences between a target color and the print colors of the several noticeable colors is determined as a color difference of the decision subject. Then, it is decided whether the color difference of the decision subject is larger than the reference color difference input in the color difference input section 714.

If the color difference of the decision subject is larger than the reference color difference (YES in Step S5 of FIG. 5), the print density of the ink is changed by a predetermined value (Step S6 of FIG. 5) and the forecast of the print color in Step S4 is performed again. In addition, the color difference between a target color and the print color of the noticeable color in the print density of a new ink is decided.

A series of processing of the change of the print density of the ink (Step S6 of FIG. 5), the forecast of the print color (Step S4 of FIG. 5), and the decision of the color difference (Step S5 of FIG. 5) are repeated until the color difference of the decision subject converges below the reference color difference (No in Step S5 of FIG. 5), or until the number of the repetition of the processing reaches the predetermined maximum number of repetition (for example, 3000 times). The color forecasting section 240 corresponds to not only an example of the color guess section in the present invention but also an example of the density calculation section in the present invention. If the change of the print density of the ink is terminated, the print density of the ink at the time of the termination of the change thereof is provisionally determined as the initial print density.

In this embodiment, specifically, a method of forecasting the print colors of the combinations of all print densities and calculating print colors in a round robin manner while changing the adjustment amount of the print densities of C, M, Y, and K color ink materials in a predetermined adjustment range (for example, in the range of −0.15 to +0.15) by a minute adjustment step (for example, 0.025) (if print densities obtained from the combination of four C, M, Y, and K colors and 13 steps are used, 28561 print colors are calculated); or a method of calculating print colors and color differences while changing the adjustment amount of the print densities of C, M, Y, and K color ink materials in a predetermined adjustment range (for example, in the range of −0.15 to +0.15) by a large adjustment step (for example, 0.05), and adjusting the adjustment amount of the print densities by a minute adjustment step only when a newly calculated color difference is smaller than the color difference having been calculated so far, may be used as a method of changing the print density of the ink so that the color difference of the decision subject converges below the reference color difference. In this embodiment, (1) the print color and the color difference are calculated while the adjustment amount of the print densities of the ink materials is changed in a predetermined adjustment range (in the range of −0.15 to +0.15) by a large adjustment step (0.05), and (2) when a newly calculated color difference is smaller than the color difference having been calculated so far, the print colors and the color differences of 8 patterns where the C, M, Y, and K colors are changed in positive and negative directions by a minute adjustment step (0.025) are calculated. (3) In addition, returning to the processing (2), the print colors and the color differences are calculated by using the adjustment amount of the print densities corresponding to a direction where the minimum color difference of the calculated color differences of 8 patterns is calculated. Since the adjustment amount of the print densities is changed by a large adjustment step and the adjustment amount of the print densities is then changed by a minute adjustment step after the adjustment direction of the adjustment amount of the print densities is determined, as described above, it is possible to shorten the processing time that is required to determine the initial print density.

If the initial print density is provisionally determined, the color forecasting section 240 transmits an instruction for displaying a calculation result displaying screen to the image displaying section 270 and the calculation result displaying screen is displayed on the display screen 32a.

Figure 12A:
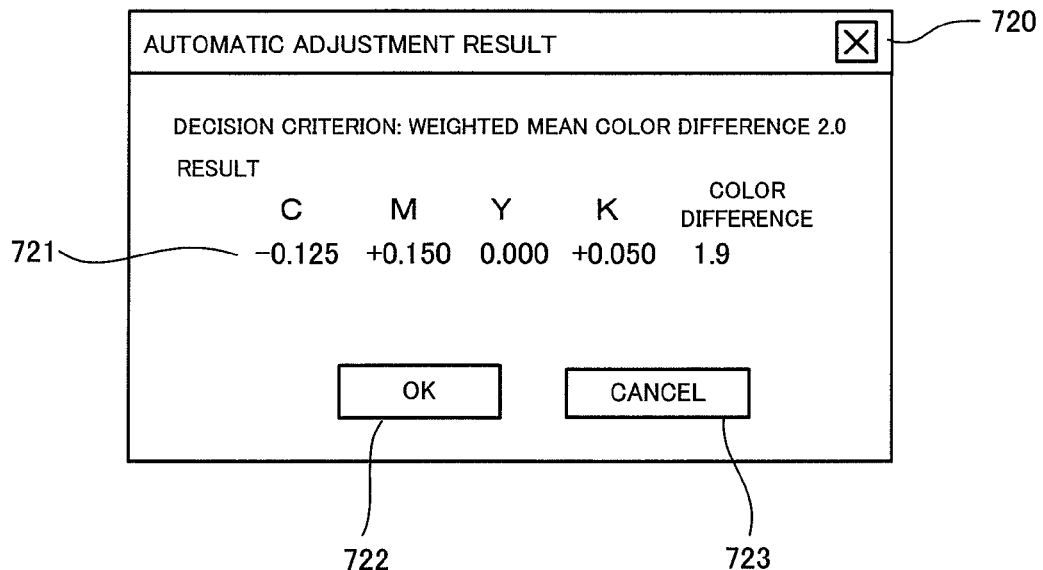
FIGS. 12A and 12B are views showing an example of a calculation result displaying screen.
Figure 12B:
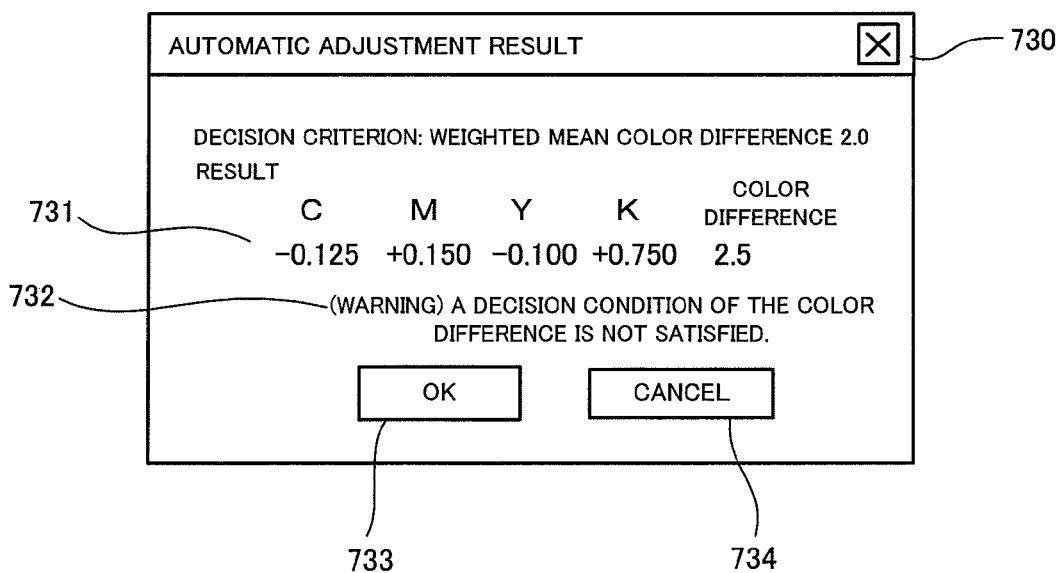

FIGS. 12A and 12B are views showing an example of the calculation result displaying screen.

FIG. 12A shows a calculation result displaying screen 720 displayed when the initial print density has converged, and FIG. 12B shows a calculation result displaying screen 730 displayed when the initial print density does not converge and the number of the repetition of the processing reaches the predetermined maximum number of repetition.

The calculation result displaying screens 720 and 730 display result displaying sections 721 and 731 that display the initial print densities of the C, M, Y, and K colors and the color differences between target color and the print colors; OK buttons 722 and 733 that are used to fix the initial print densities displayed on the result displaying sections 721 and 731; and buttons 723 and 734 that are used to stop the setting the initial print densities. The calculation result displaying screen 730 shown in FIG. 12B also displays a warning message 732 of "a decision condition of the color difference is not satisfied".

If a user selects the OK buttons 722 and 733 by using the mouse 34, the initial print densities are transmitted from the color forecasting section 240 shown in FIG. 4 to the density adjusting section 250.

The density adjusting section 250 forms an expected image of the print image, which is to be printed in the printing system 1, on the basis of the print image data and the print densities of the C, M, Y, and K color ink materials transmitted from the color forecasting section 240. Further, the density adjusting section 250 transmits the expected image to the image displaying section 270, and instructs the noticeable color setting screen 500 shown in FIG. 6 to be updated.

The image displaying section 270 replaces the print image 510, which is displayed on the noticeable color setting screen 500 shown in FIG. 6, with the expected image; displays previously set dot percentage of each noticeable color, a target color, priority, a forecasted print color, and the color difference between the target color and the print color on the color information displaying section 520; and displays the calculated initial print density of the ink on the manual density adjusting section 530. A user changes a value on the manual density adjusting section 530 by using the mouse 34 in order to manually and finely adjust the initial print density of the ink. The image displaying section 270 corresponds to an example of a displaying section in the present invention.

Further, if a user selects the EXECUTE button 544 by using the mouse 34, the initial print density of the ink is transmitted from the density adjusting section 250 of FIG. 4 to the control device 10 and the print density of the ink of the printing machine 20 is set to the initial print density by the control device 10 (Step S7 of FIG. 5).

If the initial print density of the ink is set, test printing is repeated while the print density of the ink is finely adjusted in the control device 10 so that the colorimetric value obtained by the colorimeter 11 becomes suitable for the target color. When the print density of the ink is stabilized, a printing start signal is transmitted from the workstation 30 to the control device 10. Since the initial print density of the ink is set to a value approaching a target print density for achieving a target color in this embodiment, it is possible to shorten the time required until the stabilization of the print density of the ink and to suppress the occurrence of spoilage.

The first embodiment has been described so far, and a second embodiment of the present invention will be described. A second embodiment of the present invention has the same structure as the first embodiment shown in FIG. 4, but is different from the first embodiment only in terms of a method of setting a noticeable color in the noticeable color setting section 220. Accordingly, FIGS. 4, 6, and 7 are also used to describe this embodiment, and only the difference between the first and second embodiments will be described.

Even in this embodiment, if the region radio button 612 shown in FIG. 6 is selected so that a region including important colors is selected on the print image 510 of the noticeable color setting screen 500, the position information of the region is transmitted from the operation section 260 of FIG. 4 to the noticeable color setting section 220. In the noticeable color setting section 220 of this embodiment, several dot percentages representing all pixels in a region represented by the position information, which is transmitted from the operation section 260, of the print image data are analyzed. Accordingly, the total number of pixels having the same dot percentage is calculated. In addition, the dot percentage, which corresponds to the large calculated total number, is selected as a predetermined numeral (two in this embodiment), and the color represented by the selected dot percentage is set as a noticeable color. A color, which corresponds to high frequency of appearance, in the region is set as a noticeable color. For this reason, even though important colors are dispersed in the region, a user can easily set the important colors as noticeable colors.

Further, in the noticeable color setting section 220, a high priority order is given to the several set noticeable colors in descending order of the area of a portion, which includes the noticeable colors, on the print image 510. In general, an important color frequently has a large area on the print image. Further, since a priority order is automatically given according to the area corresponding to each color, it is possible to obtain the preferred print image where an important color is represented as a target color even though a user does not have skilled knowledge about printing.

The second embodiment has been described so far, and a third embodiment of the present invention will be described. A third embodiment of the present invention has the same structure as the first embodiment shown in FIG. 4, but is different from the first embodiment only in terms of the processing in the color forecasting section 240. Accordingly, FIGS. 4 and 5 are also used to describe this embodiment, and only the difference between the first and third embodiments will be described.

This embodiment is different from the first embodiment in terms of the contents of a print color forecast processing of Step S4 of FIG. 5.

Even in this embodiment, prior to printing, the print density of the ink of the printing machine 20 is set to a standard print density in the control device 10, and chart images based on chart image data are printed in the printing machine 20.

Then, while the print densities of the C, M, Y, and K color ink materials have been independently changed into −0.2, −0.1, +0.1, and +0.2 with respect to the standard print densities, respectively, the chart images are printed and the C, M, Y, and K colors are set to the changed states of "standard print density −0.2", "standard print density −0.1", "standard print density +0.1", and "standard print density +0.2", respectively. Accordingly, a total of 16 chart images are printed. The colorimetry of each patch of the formed chart images is also performed.

As described above, the chart image in the standard print density and the 16 chart images in the changed densities are printed, and the colorimetry of each patch of the chart images is performed. Further, in addition to a color of each patch in the standard print density (hereinafter, referred to as a reference color), a corresponding relationship between the variation of the print density changed with respect to the standard print density and a difference between the reference color and a color of each patch in the changed print density is stored in the storage section 280. A standard profile where the density conversion values X, Y, and Z of colorimetric values of patches in the standard print densities C, M, Y, and K correspond to the input dot percentages C, M, Y, and K of patches, and a difference profile where the print color differences ΔX, ΔY, and ΔZ between the variations Dc, Dm, Dy, and Dk of the print densities and the patches correspond to the input dot percentages C, M, Y, and K of the patches, are stored in this embodiment. Since only the corresponding relationship, which is obtained by actually performing the colorimetry of each patch, is stored as described above, it is possible to reduce the required memory space.

When the printing is actually performed, the noticeable color of the image is set (Steps S1 and S2 of FIG. 5), a target color of the noticeable color is acquired (Step S3 of FIG. 5), the tentative print density of the ink is determined, a print color of a noticeable color in the tentative print density of the ink is forecasted (Step S4 of FIG. 5), and a color difference between the forecasted print color and a target color is decided (Step S5 of FIG. 5) like the first embodiment. The change of the tentative print density of the ink (Step S6 of FIG. 5), the forecast of the print color of the noticeable color in a new tentative print density of the ink (Step S4 of FIG. 5), and the decision of the color difference (Step S5 of FIG. 5) are repeated until the color difference of the decision subject converges below the reference color difference (No in Step S5 of FIG. 5). In this embodiment, the print density of the ink for achieving a target color is calculated, and the forecasted print density is set to the tentative print density of the ink in an initial state, so that the processing time required until the color difference converges below the reference color difference is shortened.

Figure 13:
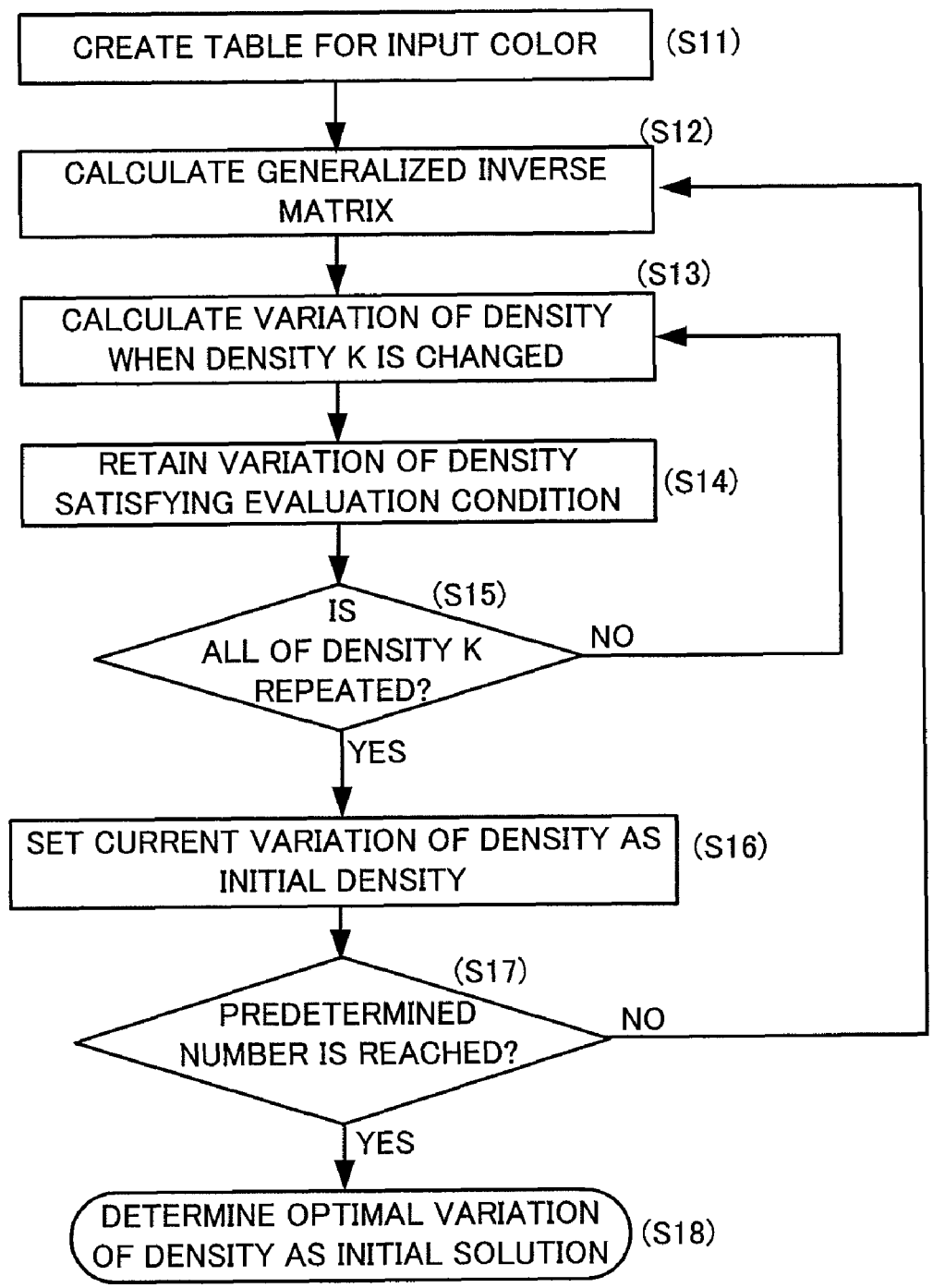
FIG. 13 is a flowchart illustrating a series of processing for calculating the print density of an ink material.

FIG. 13 is a flowchart illustrating a series of processing for calculating the print density of an ink material.

First, only portions, which approach the input C, M, Y, and K values of the noticeable colors where the input dot percentages C, M, Y, and K of the patches are set, are extracted from the standard profile and the difference profile that are stored in the storage section 280. Subsequently, interpolation processing is performed, so that a table representing a corresponding relationship between the variations Dc, Dm, Dy, and Dk of the print densities of the noticeable colors and the print color differences ΔX, ΔY, and ΔZ with respect to a reference color is made (Step S11 of FIG. 13).

Figure 14:
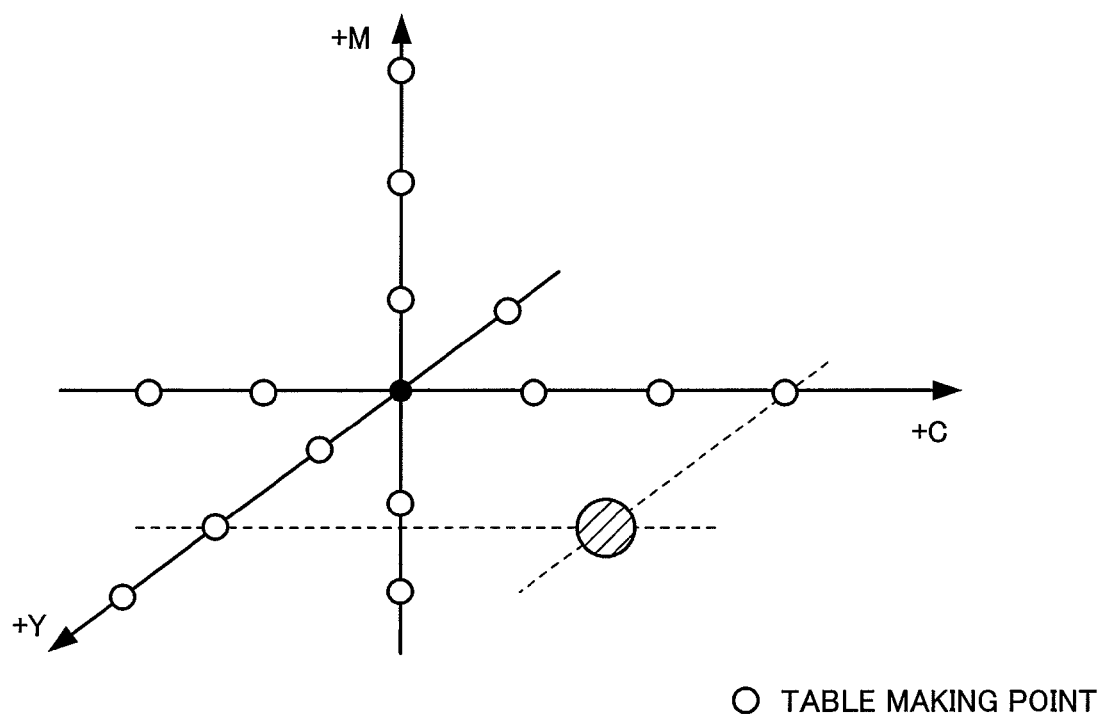
FIG. 14 is a conceptual diagram of a made table.

FIG. 14 is a conceptual diagram of the made table.

Axes shown in FIG. 14 indicate the variations of the print densities of the C, M, Y, and K color ink materials with respect to the standard print density. A central point plotted by a black circle indicates the standard print density, and the value of the central point indicates the print color of the noticeable color (reference color) while the print density of the ink is set to the standard print density. Further, each of points plotted by a white circle indicates a print density when the print densities of the C, M, Y, and K color ink materials have been independently changed with respect to the standard print densities, respectively. The values of the points indicate differences between the print colors of the noticeable colors and the standard colors while the print densities of the ink materials are set to the print densities represented by the points. For example, a print color of a noticeable color in the print density of the ink, which is indicated by a point plotted by a hatched circle, can be calculated by substituting the values of each of the points, which are plotted by the black circle and the white circle, in Expression (1). In addition, if the intervals between print densities are not smooth (coarse) at the time when the print densities of the C, M, Y, and K color ink materials have been independently changed with respect to the standard print densities, respectively, a table may be created by fining the variation amounts of the print densities of the ink materials by performing interpolation processing for the print densities of the ink materials, as in the first embodiment.

Herein, in Expression (1), a difference between two forecasted print colors R1 and R2 is represented by the total sum of differences between the colorimetric values of the patches in the standard print densities and the colorimetric values of the patches in the changed print densities of the ink materials with respect to the variations of the print densities of the C, M, Y, and K color ink materials, and is represented by $$R1 - R2 = \Sigma (R1_{Color} - R2_{Color}) \quad (1\_1)$$

If the colorimetric values (L*, a*, and b*) are represented by colorimetric density values (−log(X), −log(Y), and −log(Z)), a corresponding relationship between the variations Dc, Dm, Dy, and Dk of the print densities of the ink materials, which are represented by the table of FIG. 14, with respect to the standard print densities, and the differences Δ−log(X), Δ−log(Y), and Δ−log(Z) between the print colorimetric densities of the noticeable colors in the standard print densities and the print colorimetric densities of the noticeable colors in the changed print densities is represented by the following determinant (2).

$$\begin{pmatrix} \Delta - \log X \\ \Delta - \log Y \\ \Delta - \log Z \end{pmatrix} = \begin{pmatrix} \frac{\partial -\log X}{\partial D_c} & \frac{\partial -\log X}{\partial D_m} & \frac{\partial -\log X}{\partial D_y} & \frac{\partial -\log X}{\partial D_k} \\ \frac{\partial -\log Y}{\partial D_c} & \frac{\partial -\log Y}{\partial D_m} & \frac{\partial -\log Y}{\partial D_y} & \frac{\partial -\log Y}{\partial D_k} \\ \frac{\partial -\log Z}{\partial D_c} & \frac{\partial -\log Z}{\partial D_m} & \frac{\partial -\log Z}{\partial D_y} & \frac{\partial -\log Z}{\partial D_k} \end{pmatrix} \begin{pmatrix} D_c \\ D_m \\ D_y \\ D_k \end{pmatrix} \quad (2)$$

Further, Expression (2) is represented as $$X = JD \quad \text{Expression } (2\_1)$$

If the differences Δ−log(X), Δ−log(Y), and Δ−log(Z) between the print colorimetric densities of the noticeable colors in actual standard print densities and the colorimetric density values of the target colors of the noticeable colors are substituted with the left term X, solutions D become the density differences between the print densities of the ink materials for achieving the target colors and the standard print densities. However, since D corresponds to three dimensions and X corresponds to four dimensions, there is no inverse matrix $J^-$ that is used to obtain a unique solution satisfying $D=J^-X$. For this reason, the following two conditions are added to obtain a generalized inverse matrix $J^+$, and an approximate solution D' approaching the exact solution D is uniquely determined by the following determinant.

$$D'=J^+X \qquad \text{Expression (2\_2)}$$

(Condition 1) Since the approximate solution D' is different from the exact solution D, "JD'≠X" is satisfied and an error e (=JD'−X) is generated. The variation D' of the print density where the square of the error e becomes minimum is calculated. (Least squares solution)

(Condition 2) The variation D of the print density is a difference with a standard print density. Accordingly, if the variation D is as small as possible, the stability of the printing machine is improved after adjustment. For this reason, the variation D of which the absolute value becomes minimum is calculated. (Norm minimal solution)

A color matching function of the spectral densities of C, M, and Y colors and the spectral densities of X, Y, and Z colors is mainly in corresponding relationships between C and X, between M and Y, and between Y and Z. For example, if Dc of Determinant (2) is changed, Δ−log(X) is significantly changed. However, if the print density of K color is changed, all of the colorimetric density values X, Y, and Z are changed. For this reason, even when only the print density Dk of the K color ink is changed, the print densities Dc, Dm, and Dy of the C, M, and Y color ink materials are changed in the solution D' calculated under the norm minimal condition. As a result, the K color is not particularly changed.

Determinant (3) is a determinant that is obtained by transposing a Dk component representing the variation of the K color to the left side in Determinant (2).

$$\begin{pmatrix} \Delta - \log X - \frac{\partial - \log X}{\partial D_k} D_k \\ \Delta - \log Y - \frac{\partial - \log Y}{\partial D_k} D_k \\ \Delta - \log Z - \frac{\partial - \log Z}{\partial D_k} D_k \end{pmatrix} = J \begin{pmatrix} D_c \\ D_m \\ D_y \end{pmatrix}, \qquad (3)$$

$$J = \begin{pmatrix} \frac{\partial - \log X}{\partial D_c} & \frac{\partial - \log X}{\partial D_m} & \frac{\partial - \log X}{\partial D_y} \\ \frac{\partial - \log Y}{\partial D_c} & \frac{\partial - \log Y}{\partial D_m} & \frac{\partial - \log Y}{\partial D_y} \\ \frac{\partial - \log Z}{\partial D_c} & \frac{\partial - \log Z}{\partial D_m} & \frac{\partial - \log Z}{\partial D_y} \end{pmatrix}$$

Dk component, which relates to the K color, of Determinant (2) is separated and Dk component is set to "0". The approximate solution D' is calculated under a condition that only C, M, and Y colors are changed and the K color is individually adjusted, so that it is possible to improve the solution accuracy.

Further, if several noticeable colors and the target colors of the several noticeable colors are set, Expression (2\_1) has Xn "differences \_n between noticeable colors \_n in the standard print densities and the colorimetric density values of the target colors \_n" for each of the several noticeable colors. However, since the print density of the ink set in one time printing has one value, the calculated solution D' "the density difference between the print density n of ink for achieving the target color n and the standard print density" has one value for the noticeable color and the target color. Assuming that the weight added to each of Xn is represented by Wn, several simultaneous equations expressed as Expression (4) are made.

$$\begin{cases} W_1 X_1 = W_1 J_1 D \\ W_2 X_2 = W_2 J_2 D \\ \vdots \\ W_n X_n = W_n J_n D \end{cases} \qquad (4)$$

The weight Wn of each color is a diagonal matrix where diagonal components are the same. If Expression (4) is represented by a determinant, the following expression is obtained.

$$W \begin{pmatrix} X_1 \\ X_2 \\ \vdots \\ X_n \end{pmatrix} = WJ \begin{pmatrix} D_c \\ D_m \\ D_y \end{pmatrix}, \ J = \begin{pmatrix} J_1 \\ J_2 \\ \vdots \\ J_n \end{pmatrix}, \ W = \begin{pmatrix} W_1 & & & \\ & W_2 & & \\ & & \ddots & \\ & & & W_n \end{pmatrix} \qquad (5)$$

Simultaneous equations representing a corresponding relationship for each of the several target colors are made and the print density common to the target colors is calculated. Accordingly, even if several target colors are set, it is possible to efficiently calculate the print densities that represent the target colors.

The conditions are added and a Moore-Penrose type generalized inverse matrix J+ is calculated. An approximate solution D' of a solution D, which represents the variations of the print densities of the ink for achieving the target colors with respect to the standard print densities, is obtained (Step S12 of FIG. 13).

Subsequently, the approximate solution D' calculated by Expression (2\_2) is substituted in the solution D of Expression (2\_1). Therefore, while the print densities of the ink materials are changed from the standard print densities by variations D', print colors X' when the noticeable colors are printed are calculated.

In addition, differences between the calculated print colors X' and the target colors X are calculated (Step S13 of FIG. 13), and a mean color difference of these differences is obtained.

At this point, if the calculated mean color difference is smaller than the existing mean color difference, the variations D' (Dk, Dc, Dm, and Dy) and a mean color difference are stored (Step S14 of FIG. 13). Incidentally, in the present embodiment, an example in which the variations D' at the time of the minimum mean color difference are stored has been described, but the variations D' at the time when the maximum color difference of the noticeable color is minimum may be stored for the evaluation condition in step S14.

Subsequently, the forecasted variation Dk of the density of the K color ink is changed (Step S15 of FIG. 13), the calculation of the print colors X', the calculation of the differences between the print colors X' and the target colors X (Step S13 of FIG. 13), the calculation of the mean color difference, and the storage of the variations D' (Dk, Dc, Dm, and Dy) and the mean color difference (Step S14 of FIG. 13) are performed. In this embodiment, the variation Dk of the K color ink is changed in the range of "−0.15 to +0.15" by every variation step of 0.025, and the processing of Steps S13 to S15 are repeated.

If the processing of all steps is terminated (Yes in Step S15 of FIG. 13), the variations D' (Dk, Dc, Dm, and Dy) stored at the present time are set as initial solutions (Step S16 of FIG. 13).

Further, the variations D' (Dk, Dc, Dm, and Dy) set as the initial solutions are substituted in Expression (2_1) until the number of the repetition reaches the predetermined maximum number of repetition (Step S17 of FIG. 13), so that a new general matrix J+ is calculated (Step S12 of FIG. 13). In addition, the processing of Steps S13 to S16 is performed, so that the update of the initial solutions is repeated.

If the number of the repetition reaches a predetermined number of repetition (Yes in Step S17 of FIG. 13), the initial solution set at that time is determined (at step S18 of FIG. 13) as the tentative print density of the ink in the Step S6 of FIG. 5.

Subsequently, while the print densities of several ink materials are changed with starting from the determined tentative print density of the ink, the print density when the target color is achieved is searched for.

Figure 15:
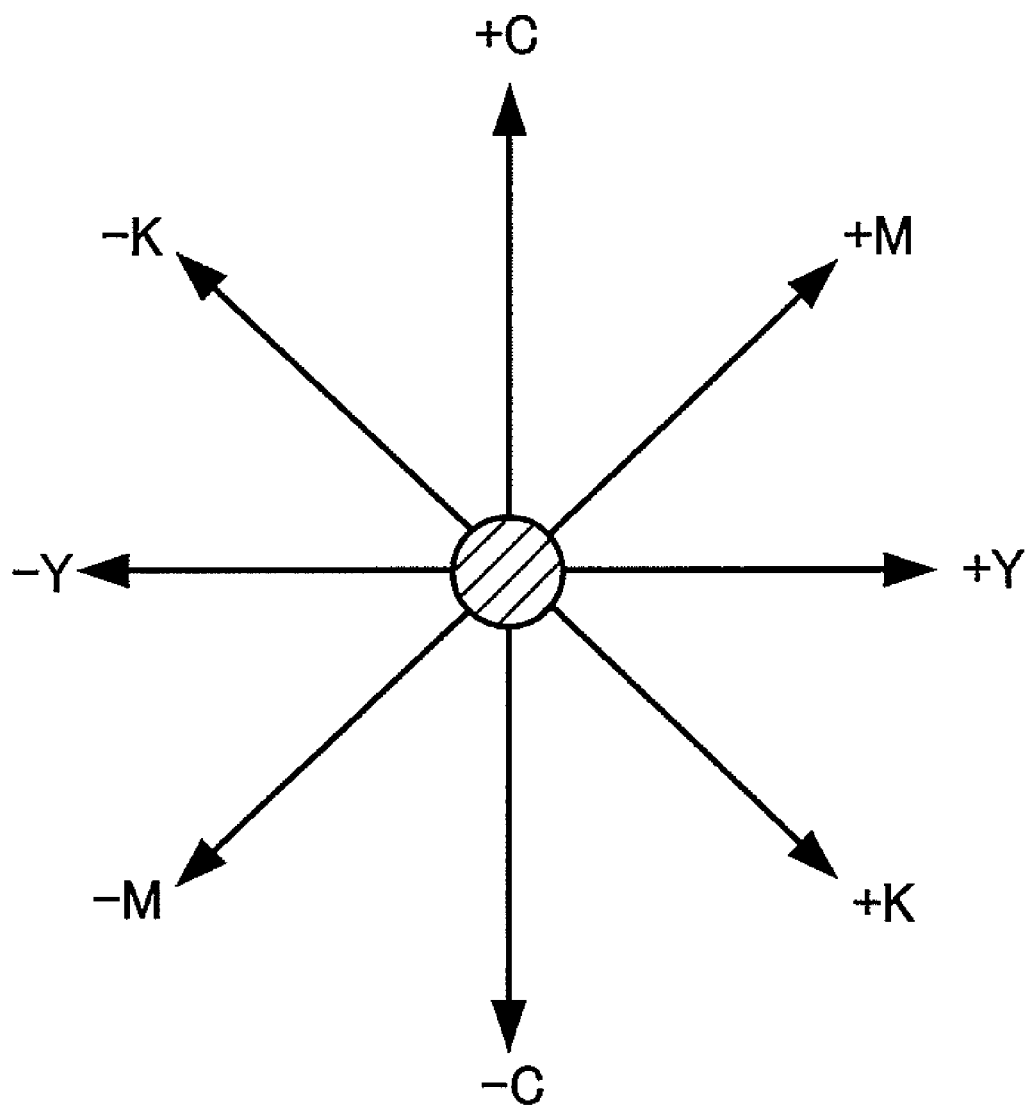
FIG. 15 is a view showing a relationship between the tentative print density of an ink material and a search direction.

FIG. 15 is a view showing a relationship between the print density of the tentative ink and a search direction.

In this embodiment, while the print densities of the C, M, Y, and K color ink materials are changed by every 0.025 with starting from the tentative print density of the ink shown by a black circle, searching is performed.

Figure 16:
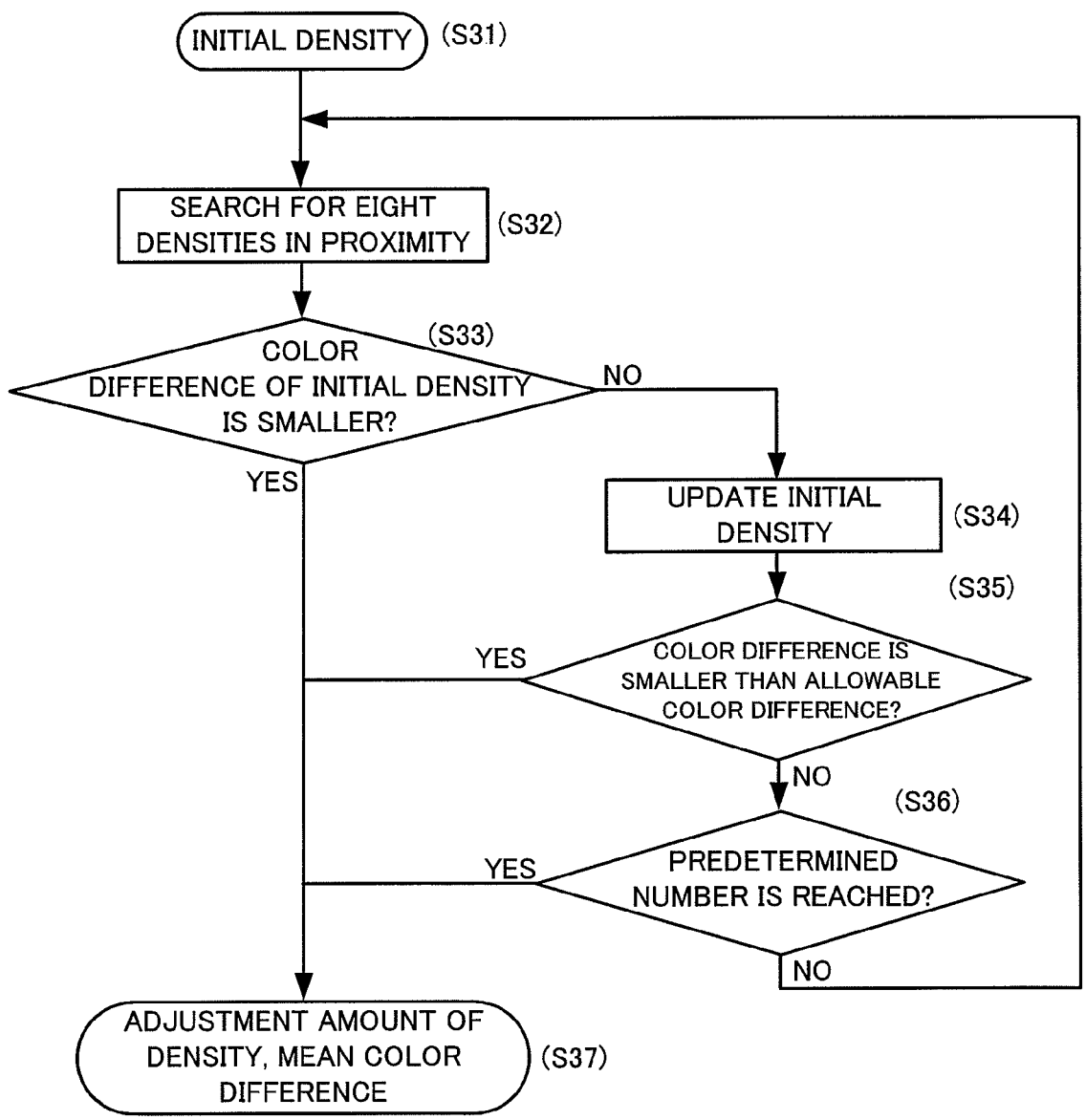
FIG. 16 is a flowchart illustrating a series of processing for searching for the print density when a target color is achieved with starting from the tentative print density of an ink material.

FIG. 16 is a flowchart illustrating a series of processing for searching for the print density when a target color is achieved with starting from the tentative print density of the ink.

First, each of the print densities of the C, M, Y, and K color ink materials is changed by every 0.025 with starting from the tentative print density of the ink (step S31 of FIG. 16), so that all of eight print densities are set. Subsequently, the differences between the print densities and the standard print densities are substituted in Expression (2_1), so that the print colors of the noticeable colors in the print densities are obtained and the mean color difference between the print colors and the target colors is calculated (Step S32 of FIG. 16).

If the calculated mean color difference is smaller than the mean color difference in the tentative print density of the ink (No in Step S33 of FIG. 16), a variation is added to the tentative print density of the ink (Step S34 of FIG. 16), the print density for achieving the minimum mean color difference is set to a new print density of the ink. In addition, if the mean color difference at the present time is smaller than a previously set allowable color difference (Yes in Step S35 of FIG. 16), the tentative print density of the ink at the present time is determined as a final print density of the ink where a target color is achieved (Step S37 of FIG. 16).

Further, if the minimum mean color difference at the present time is equal to or larger than the allowable color difference (No in Step S35 of FIG. 16), the mean color difference between a target color and the print color of the print density on the peripheral portion with starting from a new tentative print density of the ink is calculated (step S32 of FIG. 16) until the number of the repetition reaches a predetermined number of repetition (Step S36 of FIG. 16) or the mean color difference becomes smaller than the allowable color difference (Step S35 of FIG. 16). The comparison of the mean color difference (No in Step S33 of FIG. 16) and the update of the tentative print density of the ink (Step S34 of FIG. 16) are repeated.

Incidentally, in FIG. 16 as well, an example in which the print density at the time of the minimum mean color difference is searched for has been described, but the print density at the time when the maximum color difference of the noticeable color is minimum may be searched for.

The forecasted print density of the ink where a target color is achieved is calculated using a generalized inverse matrix J+ as described above, and a final print density is searched for with starting from the forecasted print density. Therefore, it is possible to reduce a problem corresponding to a local solution, and to shorten processing time.

The print densities of four C, M, Y, and K color ink materials have been set in the above description. However, for example, the print densities of not only four C, M, Y, and K color ink materials but also ink materials of specific colors may be obtained in the present invention.

Further, although ink has been described as an example of the color material, the color material of the present invention may be, for example, toner for electrophotographic printer.

What is claimed is:
1. A density calculating apparatus comprising:
an image data acquisition section that acquires print image data representing a print image to be printed by a printing system, the printing system setting print densities of color materials having a plurality of colors and printing an image based on the image data by using the color materials in the print densities;
a place designating section that designates a place on the print image represented by the print image data acquired by the image data acquisition section;
a target color acquisition section that acquires a target color of a color of the place;
a color guess section that guesses a print color of the place to be printed by the printing system on the basis of a corresponding relationship between print densities and colors of patches, the patches being obtained by printing in each print density by the printing system based on chart image data a chart image which is represented by the chart image data and on which the patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density;
a density calculation section that calculates the print densities of the color materials having the plurality of colors by using the color guess section so that the target color acquired by the target color acquisition section is achieved at the place by the printing system based on the print image data; and
a storage section that stores a reference color of each patch which is obtained by printing the chart image while setting the print density of the printing system to a standard print density when a print color of an image printed on the basis of a predetermined image data becomes a predetermined standard color, as well as stores a corresponding relationship between a color difference and a density difference, the color difference being a difference between the reference color and a color of each patch obtained by printing the chart image while setting the print density of the printing system to a series of print densities changed from the standard print density for each of the color materials having the plurality of colors, and the density difference being a difference between the print density and the standard print density, wherein the color guess section receives the designation of the tentative print density of each of the color materials having the plurality of colors and the place, acquires a relating portion according to the place of the corresponding relationship stored in the storage section, and guesses a print color at the place by interpolation processing using the reference color of each patch and the relation portion, wherein the interpolation processing includes calculation according to:

print color R of a patch approximately obtained as follows:

$$R=R(\text{std})+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print density of only Y color ink is changed and the colorimetric value of the patch printed with the standard print density is $R_{\Delta Y}$, and a difference between the colorimetric value of the patch when the print density of only K color ink is changed and the colorimetric value of the patch printed with the standard print density is $R_{\Delta K}$.

2. The density calculating apparatus according to claim 1, wherein the place designating section designates a plurality of places as the place while giving different priority orders to the places, the target color acquisition section acquires target colors of the plurality of places, and the density calculation section calculates common print densities where the target colors of the plurality of places are achieved by the printing system, while emphasizing the achievement accuracy of the place, which has a relatively high priority order, of the plurality of places as compared to the achievement accuracy of the place that has a relatively low priority order.

3. The density calculating apparatus according to claim 1, wherein the place designating section displays the print image on the basis of the print image data, and designates the place according to a selection operation for selecting the place on the displayed print image.

4. The density calculating apparatus according to claim 1, wherein the place designating section designates a region on the print image, and the target color acquisition section acquires a target color of an average color of the region.

5. The density calculating apparatus according to claim 1, wherein the place designating section designates a region on the print image, and the target color acquisition section acquires a target color of a color that most frequently appears in the region.

6. The density calculating apparatus according to claim 1, wherein the print image data is formed of a group of color data that represents colors of points on the print image, and the place designating section designates one or more point groups of which the number is large among point groups including points on the print image where the color data are common, as the place.

7. The density calculating apparatus according to claim 1, wherein the print image data is formed of groups of the color data that represents colors of points on the print image, and the place designating section designates each point, of which the color is represented by the same color data as those representing a predetermined important color, on the print image as the place.

8. The density calculating apparatus according to claim 2, wherein the place designating section gives a priority order to the plurality of places in descending order of the area of the place.

9. The density calculating apparatus according to claim 1, wherein the target color acquisition section acquires a color of the place on the print image when the print image is printed by another printing system different from the printing system, as the target color.

10. The density calculating apparatus according to claim 9, wherein the target color acquisition section calculates a color of the place on the basis of a corresponding relationship between the print data and a color on the print image when the print image is printed by the another printing system, and acquires the color as the target color.

11. The density calculating apparatus according to claim 9, wherein the target color acquisition section acquires a colorimetric value, which is obtained by performing a colorimetry of the place on a printed matter obtained by printing the print image by the another printing system, as the target color.

12. The density calculating apparatus according to claim 1, further comprising:

a displaying section that displays an expected image of a print image to be printed by the printing system on the basis of the print densities of the color materials, which have the plurality of colors and are calculated by the density calculation section, and the print image data.

13. The density calculating apparatus according to claim 1, wherein the density calculation section uniquely gives a solution x', which satisfies norm minimal solution and a least squares solution, of an exact solution obtained by solving a determinant Ax=y (wherein, A is a matrix, x is a vector representing a density difference, and y is a vector representing a print color difference), which is stored in the storage section and corresponds to the corresponding relationship, with respect to x' to a determinant x'=A'y; obtains a solution of a density difference by substituting a difference between the target color and the color of the place with y of the determinant x'=A'y by using a generalized inverse matrix A' of the matrix A; repeats the designation of the tentative print density for the color guess section and the receiving of the print color guessed by the color guess section with starting from a density, which is deviated from the standard density by the obtained density difference, as the tentative print density; and searches for a print density where the target color is achieved as a print color at the place.

14. The density calculating apparatus according to claim 13, wherein when a plurality of target colors of the plurality of places is acquired in the target color acquisition section, the density calculation section makes simultaneous equations by substituting y of determinant x'=A'y with the difference between the color of each place and a target color of the place, a solution of the density difference common to the plurality of target colors is obtained by solving the simultaneous equations, and a print density where the plurality of target colors is achieved as print colors at the plurality of places is searched for with starting from a density, which is deviated from the standard density by the obtained density difference, as the tentative print density.

15. A density setting apparatus comprising:

an image data acquisition section that acquires print image data representing a print image to be printed by a printing system, the printing system setting print densities of color materials having a plurality of colors and printing an image based on the image data by using the color materials in the print densities;

a place designating section that designates a place on the print image represented by the print image data acquired by the image data acquisition section;

a target color acquisition section that acquires a target color of a color of the place;

a color guess section that guesses a print color of the place to be printed by the printing system on the basis of a corresponding relationship between print densities and colors of patches, the patches being obtained by printing in each print density by the printing system based on chart image data a chart image which is represented by the chart image data and on which the patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density;

a density calculation section that calculates the print densities of the color materials having the plurality of colors by using the color guess section so that the target color acquired by the target color acquisition section is achieved at the place by the printing system based on the print image data;

a density setting section that sets the print densities of the color materials, which have the plurality of colors and are calculated by the density calculation section, to the printing system; and a storage section that stores a reference color of each patch which is obtained by printing the chart image while setting the print density of the printing system to a standard print density when a print color of an image printed on the basis of a predetermined image data becomes a predetermined standard color, as well as stores a corresponding relationship between a color difference and a density difference, the color difference being a difference between the reference color and a color of each patch obtained by printing the chart image while setting the print density of the printing system to a series of print densities changed from the standard print density for each of the color materials having the plurality of colors, and the density difference being a difference between the print density and the standard print density, wherein the color guess section receives the designation of the tentative print density of each of the color materials having the plurality of colors and the place acquires, a relating portion according to the place of the corresponding relationship stored in the storage section, and guesses a print color at the place by interpolation processing using the reference color of each patch and the relation portion, wherein the interpolation processing includes calculation according to:

print color R of a patch approximately obtained as follows:

$$R=R(std)+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print density of only Y color ink is changed and the colorimetric value of the patch printed with the standard print density is $R_{\Delta Y}$, and a difference between the colorimetric value of the patch when the print density of only K color ink is changed and the colorimetric value of the patch printed with the standard print density is $R_{\Delta K}$.

16. A non-transitory computer-readable medium that stores a density calculating program executed in a computer, on the computer, the density calculating program building:

an image data acquisition section that acquires print image data representing a print image to be printed by a printing system, the printing system setting print densities of color materials having a plurality of colors and printing an image based on the image data by using the color materials in the print densities;

a place designating section that designates a place on the print image represented by the print image data acquired by the image data acquisition section;

a target color acquisition section that acquires a target color of a color of the place;

a color guess section that guesses a print color of the place to be printed by the printing system on the basis of a corresponding relationship between print densities and colors of patches, the patches being obtained by printing in each print density by the printing system based on chart image data a chart image which is represented by the chart image data and on which the patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density wherein a density calculation section that calculates the print densities of the color materials having the plurality of colors by using the color guess section so that the target color acquired by the target color acquisition section is achieved at the place by the printing system based on the print image data; and a storage section that stores a reference color of each patch which is obtained by printing the chart image while density of the printing system to a standard print density when a print color of an image printed on the basis of a predetermined image data becomes a predetermined standard color, as well as stores a corresponding relationship between a color difference and a density difference, the color difference being a difference between the reference color and a color of each patch obtained by printing the chart image while setting the print density of the printing system to a series of print densities changed from the standard print density for each of the color materials having the plurality of colors, and the density difference being a difference between the print density and the standard print density, wherein the color guess section receives the designation of the tentative print density of each of the color materials having the plurality of colors and the place acquires, a relating portion according to the place of the corresponding relationship stored in the storage section, and guesses a print color at the place by interpolation processing using the reference color of each patch and the relation portion, wherein the interpolation processing includes calculation according to print color R of a patch approximately obtained as follows:

$$R=R(\text{std})+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print density of only Y color ink is changed and the colorimetric value of the patch printed with the standard print density is $R_{\Delta Y}$, and a difference between the colorimetric value of the patch when the print density of only K color ink is changed and the colorimetric value of the patch printed with the standard print density is $R_{\Delta K}$.

17. A non-transitory computer-readable medium that stores a density setting program executed in a computer, on the computer, the density setting program building:

an image data acquisition section that acquires print image data representing a print image to be printed by a printing system, the printing system setting print densities of color materials having a plurality of colors and printing an image based on the image data by using the color materials in the print densities;

a place designating section that designates a place on the print image represented by the print image data acquired by the image data acquisition section;

a target color acquisition section that acquires a target color of a color of the place;

a color guess section that guesses a print color of the place to be printed by the printing system on the basis of a corresponding relationship between print densities and colors of patches, the patches being obtained by printing in each print density by the printing system based on chart image data a chart image which is represented by the chart image data and on which the patches having a plurality of colors line up while the print density of each of the color materials having the plurality of colors is changed to a series of print densities, as well as on the basis of a tentative print density that is designated for each of the color materials having the plurality of colors, the printing system producing the print color of the place based on the print image data and the tentative print density;

a density calculation section that calculates the print densities of the color materials having the plurality of colors by using the color guess section so that the target color acquired by the target color acquisition section is achieved at the place by the printing system based on the print image data;

a density setting section that sets the print densities of the color materials, which have the plurality of colors and are calculated by the density calculation section, to the printing system; and a storage section that stores a reference color of each patch which is obtained by printing the chart image while setting the print density of the printing system to a standard print density when a print color of an image printed on the basis of a predetermined image data becomes a predetermined standard color, as well as stores a corresponding relationship between a color difference and a density difference, the color difference being a difference between the reference color and a color of each patch obtained by printing the chart image while setting the print density of the printing system to a series of print densities changed from the standard print density for each of the color materials having the plurality of colors, and the density difference being a difference between the print density and the standard print density, wherein the color guess section receives the designation of the tentative print density of each of the color materials having the plurality of colors and the place acquires, a relating portion according to the place of the corresponding relationship stored in the storage section, and guesses a print color at the place by interpolation processing using the reference color of each patch and the relation portion, wherein the interpolation processing includes calculation according to:

print color R of a patch approximately obtained as follows:

$$R=R(\text{std})+R\Delta C+R\Delta M+R\Delta Y+R\Delta K \quad (1)$$

wherein R(std) is print color of the standard print density, a difference between the colorimetric value of the patch when print density of only C color ink is changed and the colorimetric value of the patch printed with the standard print density is $R_{\Delta C}$, a difference between the colorimetric value of the patch when the print density of only M color ink is changed and the colorimetric value of the patch printed with the standard print density is $R_{\Delta M}$, a difference between the colorimetric value of the patch when the print density of only Y color ink is changed and the colorimetric value of the patch value of the patch when the print density of only K color ink is changed and the colorimetric value of the patch printed with the standard print density is $R_{\Delta K}$.

18. The apparatus of claim 1, wherein the interpolation processing further calculates minute variation of print densities in printing materials and further calculates dot percentages between dot percentages of the patches.

* * * * *